(12) United States Patent
Chope et al.

(10) Patent No.: US 11,793,258 B1
(45) Date of Patent: Oct. 24, 2023

(54) USING A FRAME TO ASSEMBLE A FABRIC ARTICLE

(71) Applicant: CreateMe Technologies LLC, New York, NY (US)

(72) Inventors: Nicholas Chope, Portland, OR (US); Vance A. Prather, Oakland, CA (US)

(73) Assignee: CreateMe Technologies LLC, New York, NY (US)

( * ) Notice: Subject to any disclaimer, the term of this patent is extended or adjusted under 35 U.S.C. 154(b) by 0 days.

(21) Appl. No.: 17/848,296

(22) Filed: Jun. 23, 2022

(51) Int. Cl.
| | | |
|---|---|---|
| *A41H 43/04* | (2006.01) | |
| *A41H 43/02* | (2006.01) | |
| *A41H 42/00* | (2006.01) | |
| *B32B 38/18* | (2006.01) | |
| *B32B 37/12* | (2006.01) | |
| *B32B 38/00* | (2006.01) | |
| *G05B 19/418* | (2006.01) | |
| *G05B 19/401* | (2006.01) | |

(52) U.S. Cl.
CPC ............ *A41H 43/04* (2013.01); *A41H 42/00* (2013.01); *A41H 43/0242* (2013.01); *B32B 37/1292* (2013.01); *B32B 38/0004* (2013.01); *B32B 38/1833* (2013.01); *G05B 19/4015* (2013.01); *G05B 19/41845* (2013.01); *Y10T 156/1057* (2015.01)

(58) Field of Classification Search
CPC ......... Y10T 156/1057; Y10T 156/1074; B32B 38/0004; B32B 37/1292; G05B 19/4015
USPC .......................................... 156/253, 263, 291
See application file for complete search history.

(56) References Cited

U.S. PATENT DOCUMENTS

| | | | | |
|---|---|---|---|---|
| 3,785,898 | A * | 1/1974 | Gerber | B29C 66/45 156/356 |
| 4,483,472 | A * | 11/1984 | Gerber | B65H 20/18 226/16 |
| 4,700,598 | A * | 10/1987 | Gerber | D06C 7/02 83/14 |
| 4,793,881 | A * | 12/1988 | Fink | B29C 66/433 156/212 |
| 8,958,901 | B2 | 2/2015 | Regan | |
| 10,265,940 | B2 | 4/2019 | Jess et al. | |

FOREIGN PATENT DOCUMENTS

WO 2021005053 A1 1/2021

\* cited by examiner

*Primary Examiner* — Scott W Dodds

(57) ABSTRACT

Systems and methods facilitate automated manufacture of fabric articles. In an example operation, a first fabric portion is mounted in a first frame, and a second fabric portion is mounted in a second frame. The first and second frames with the corresponding fabric portions are transported to a sequence of stations at which one or more operations are performed on the first and/or second fabric portion. The operations include applying an adhesive to one of the fabric portions, and then joining the first and second fabric portions by bringing the first and second frames together. The operations include cutting the joined first and second fabric portions to create corresponding joined first and second components of a fabric article.

10 Claims, 28 Drawing Sheets

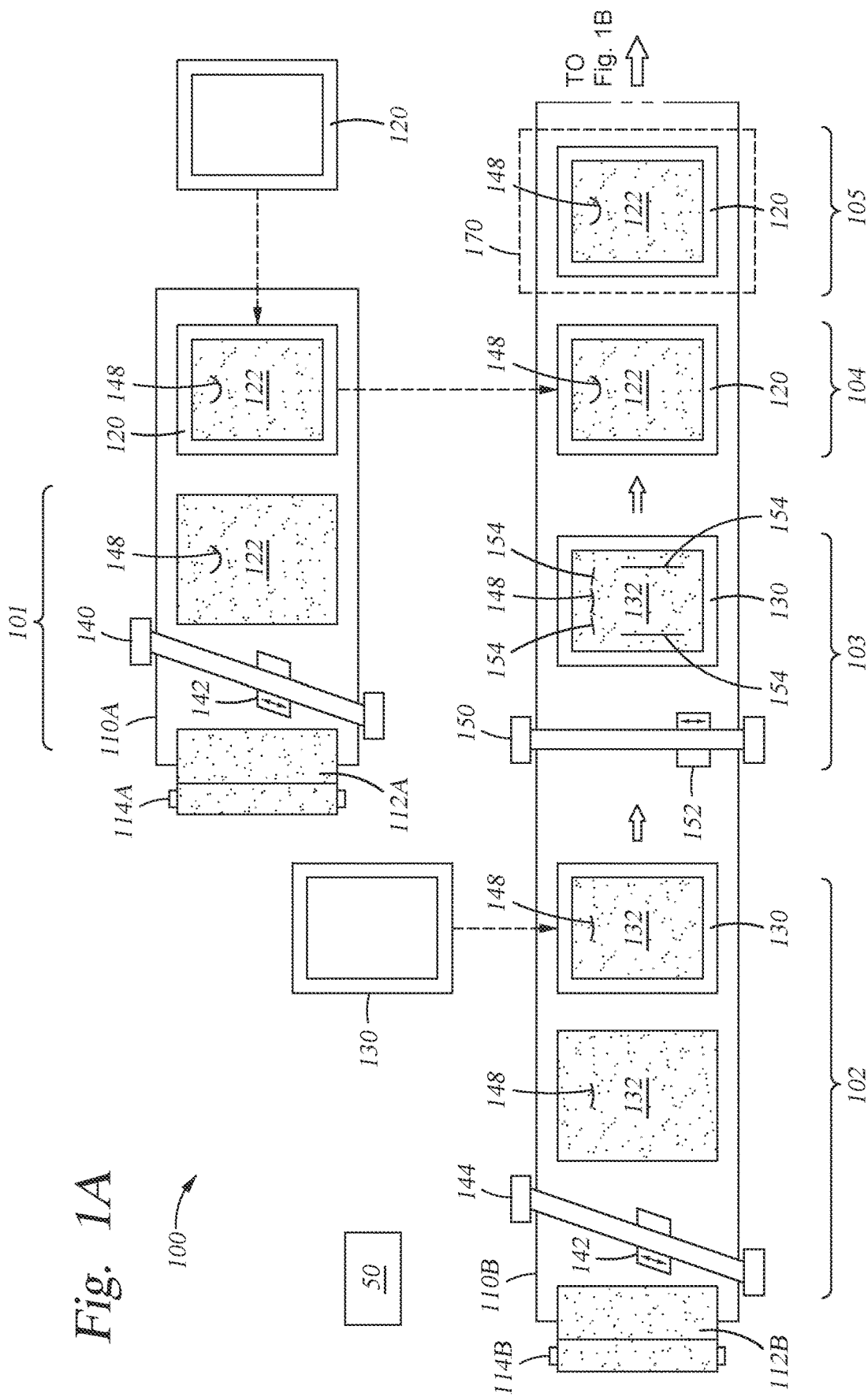

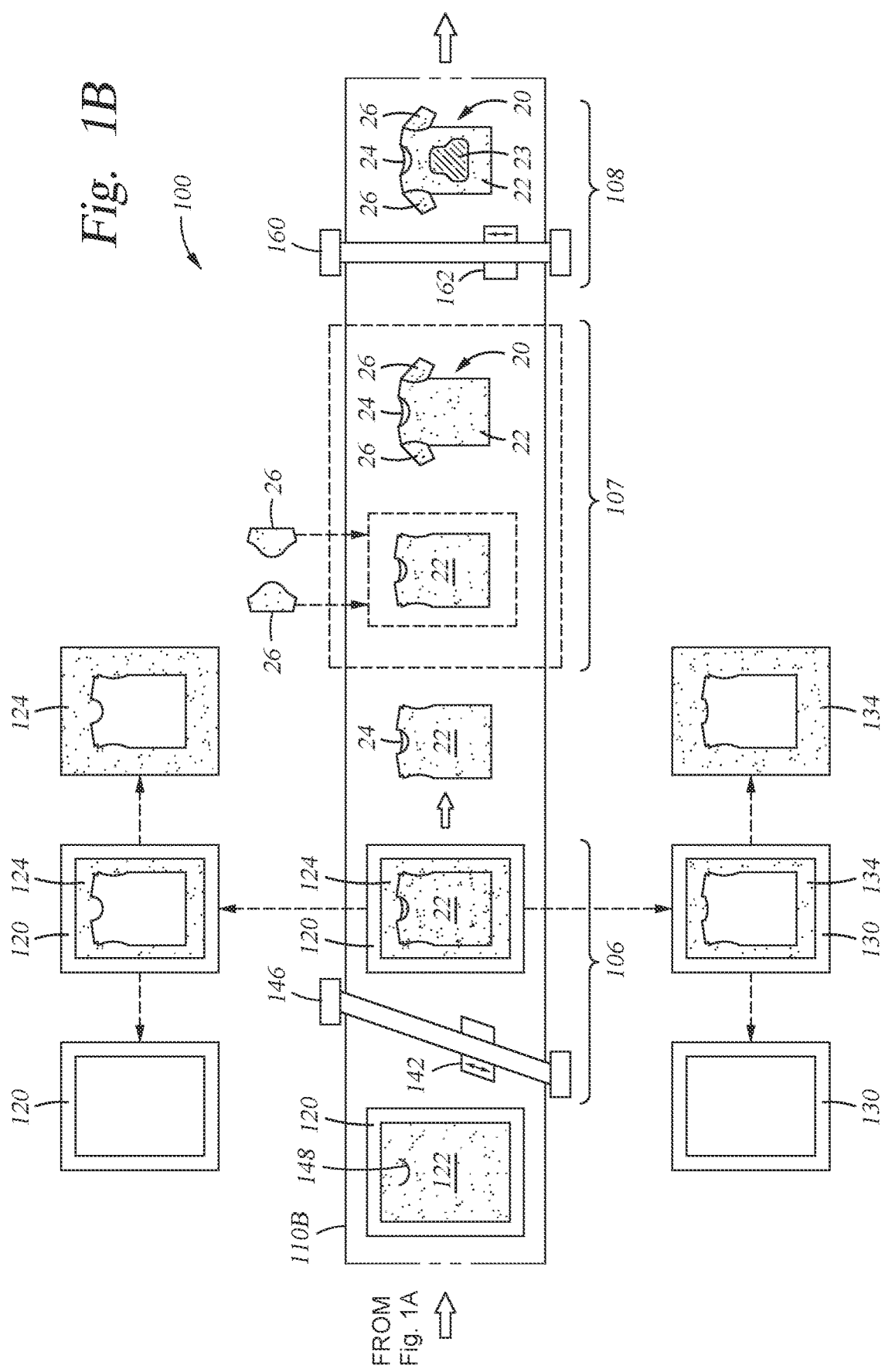

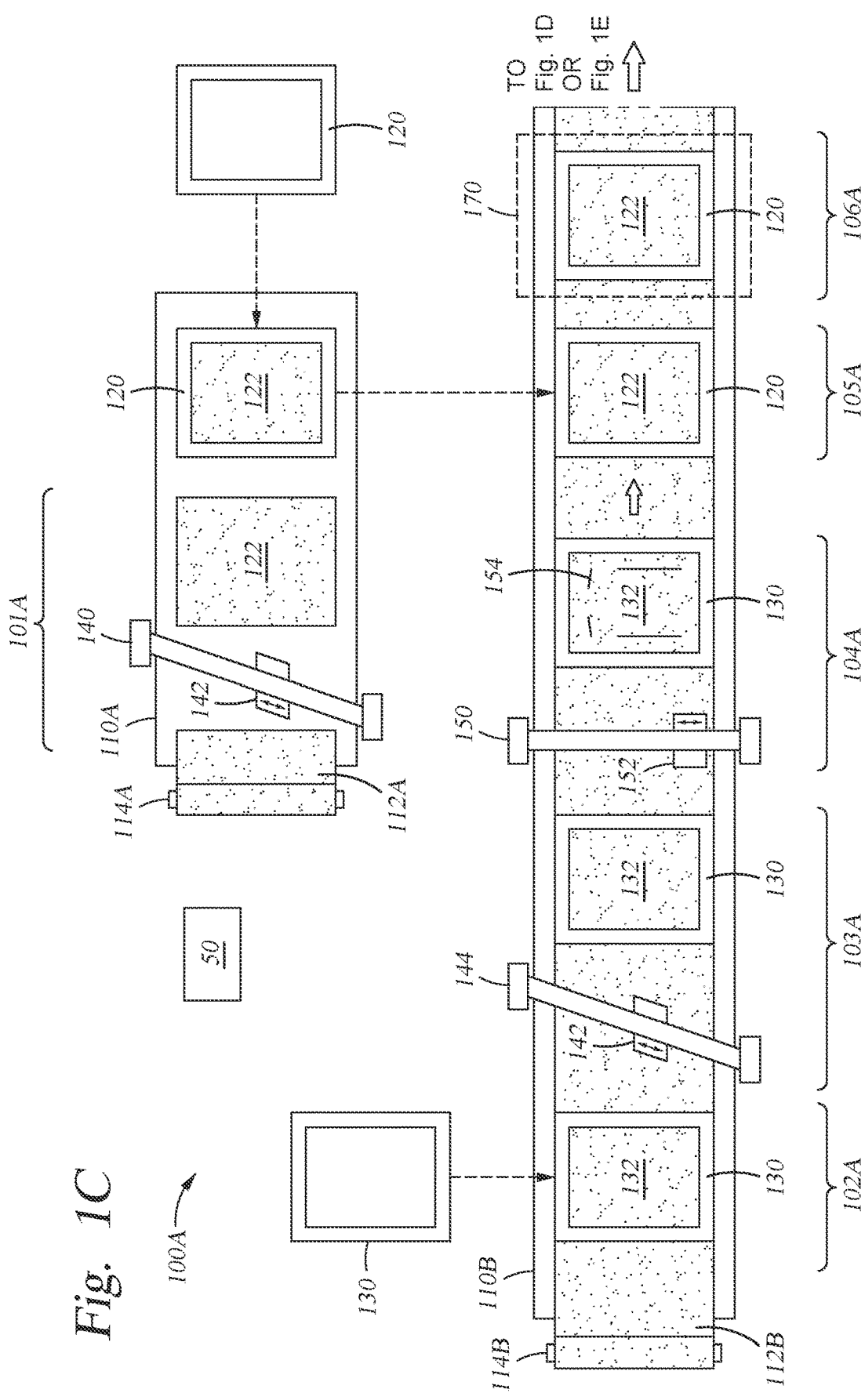

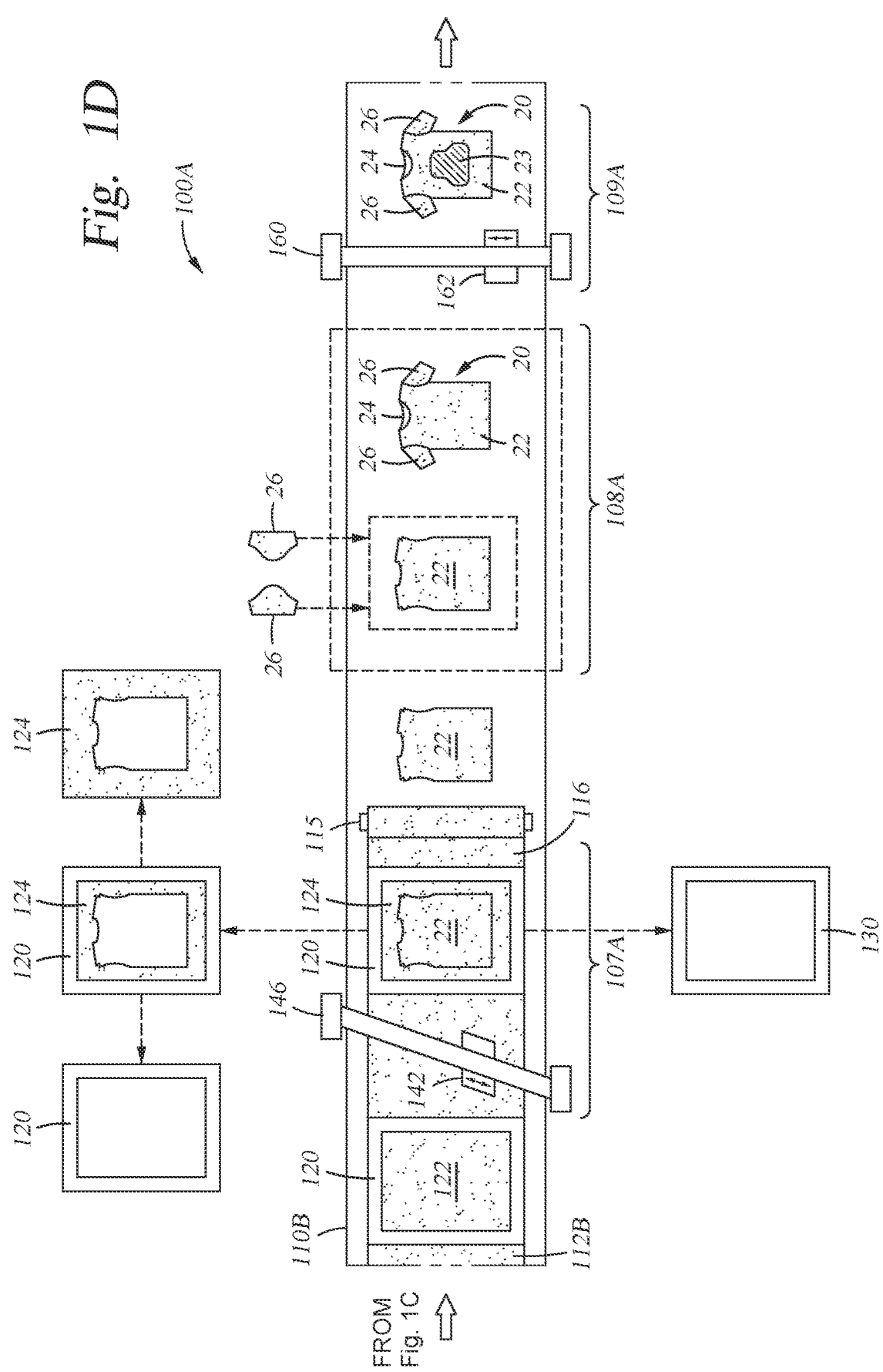

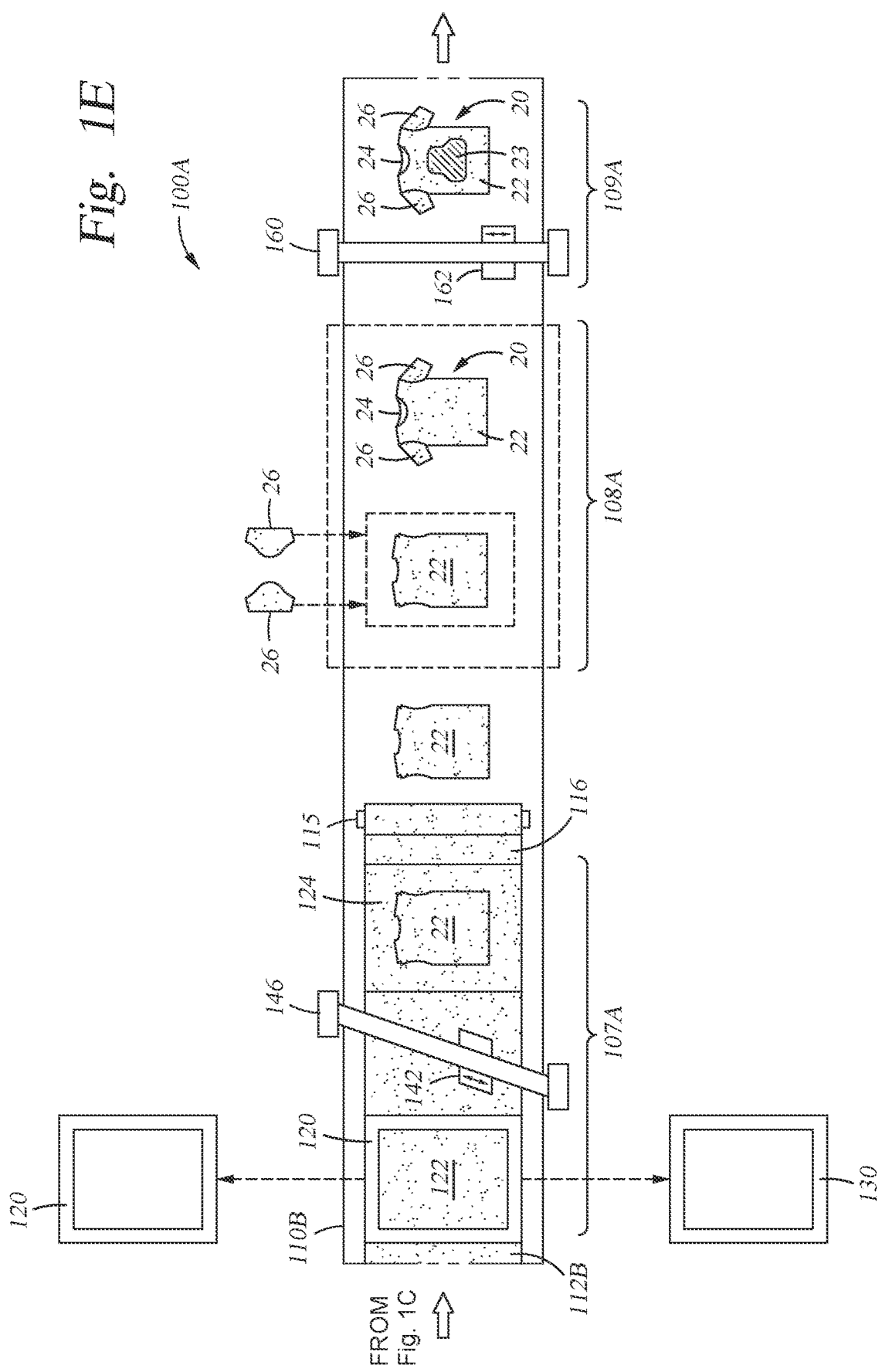

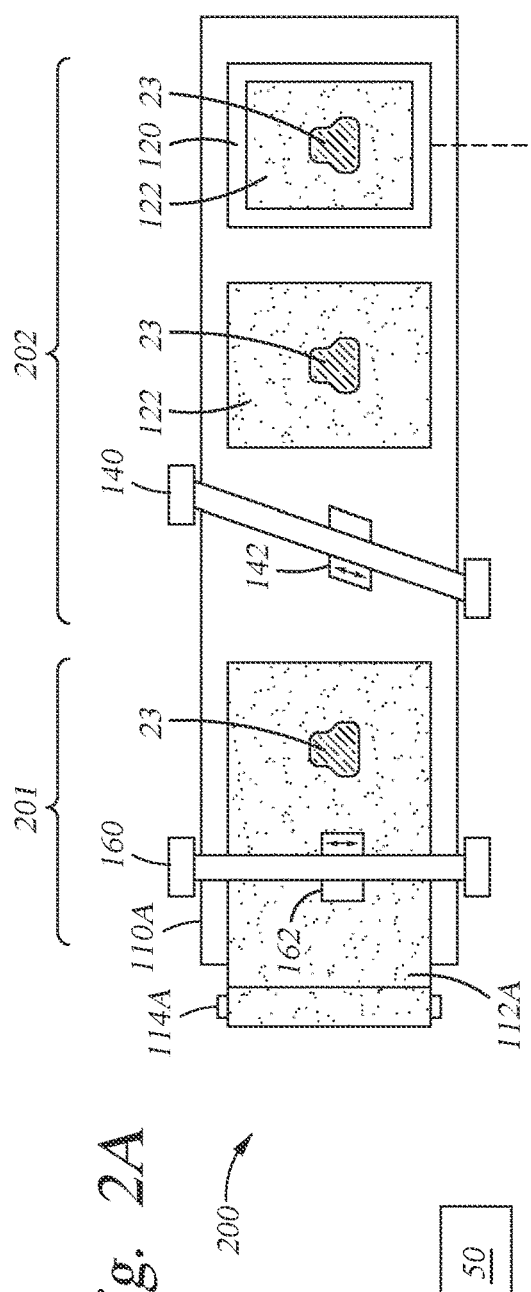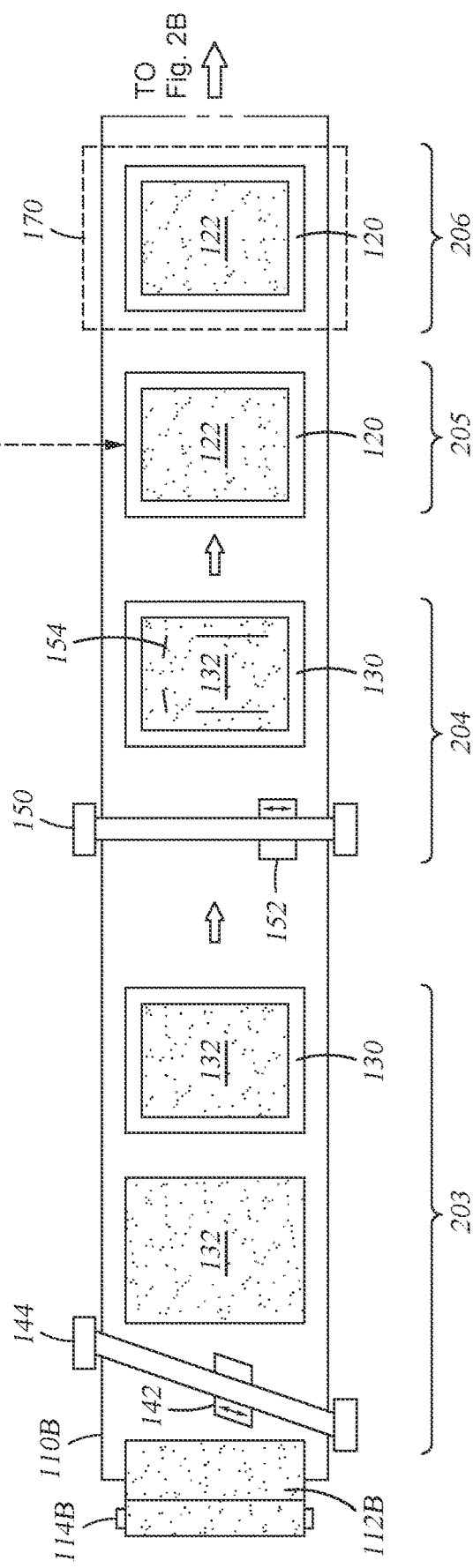
Fig. 2A

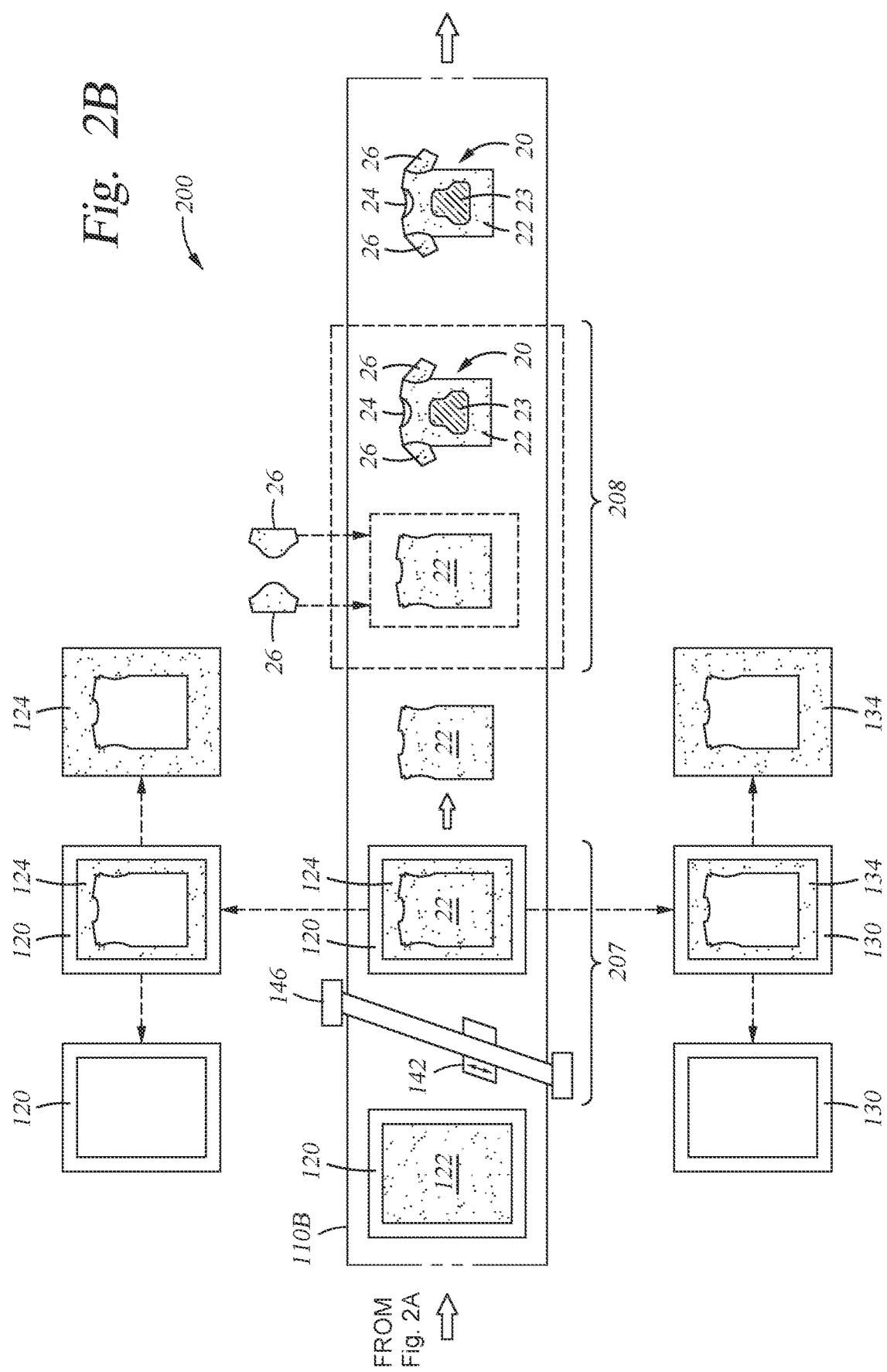

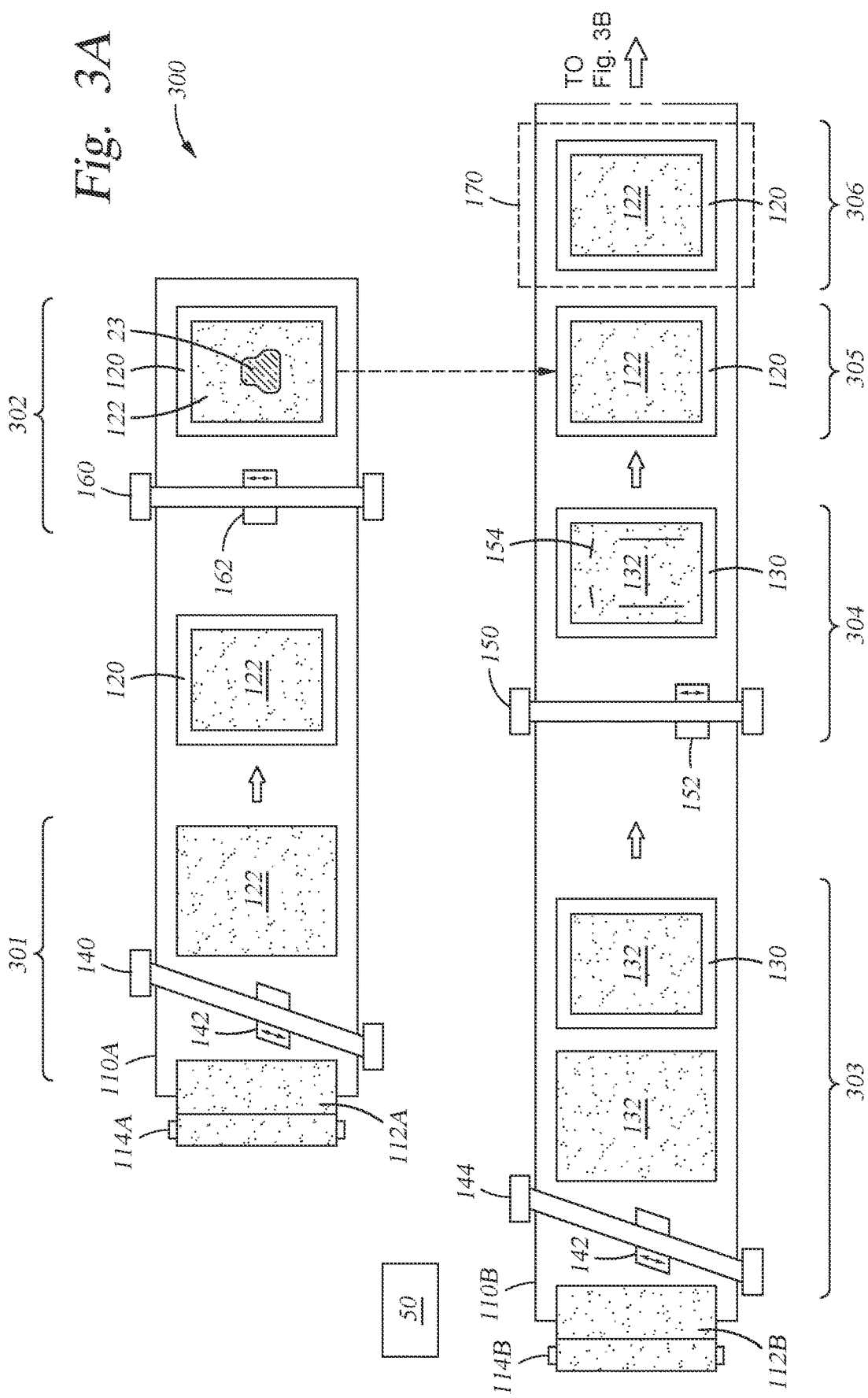

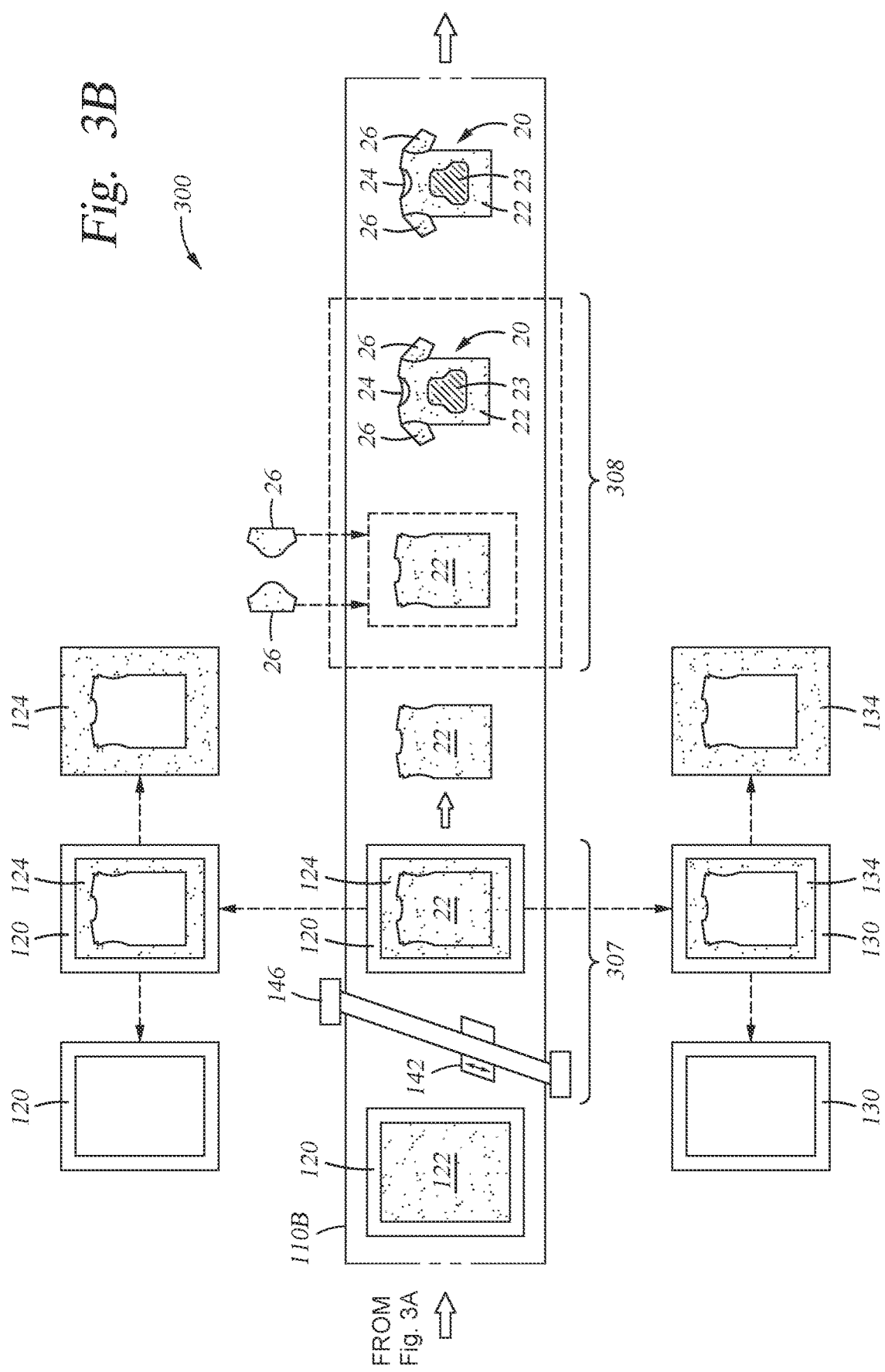

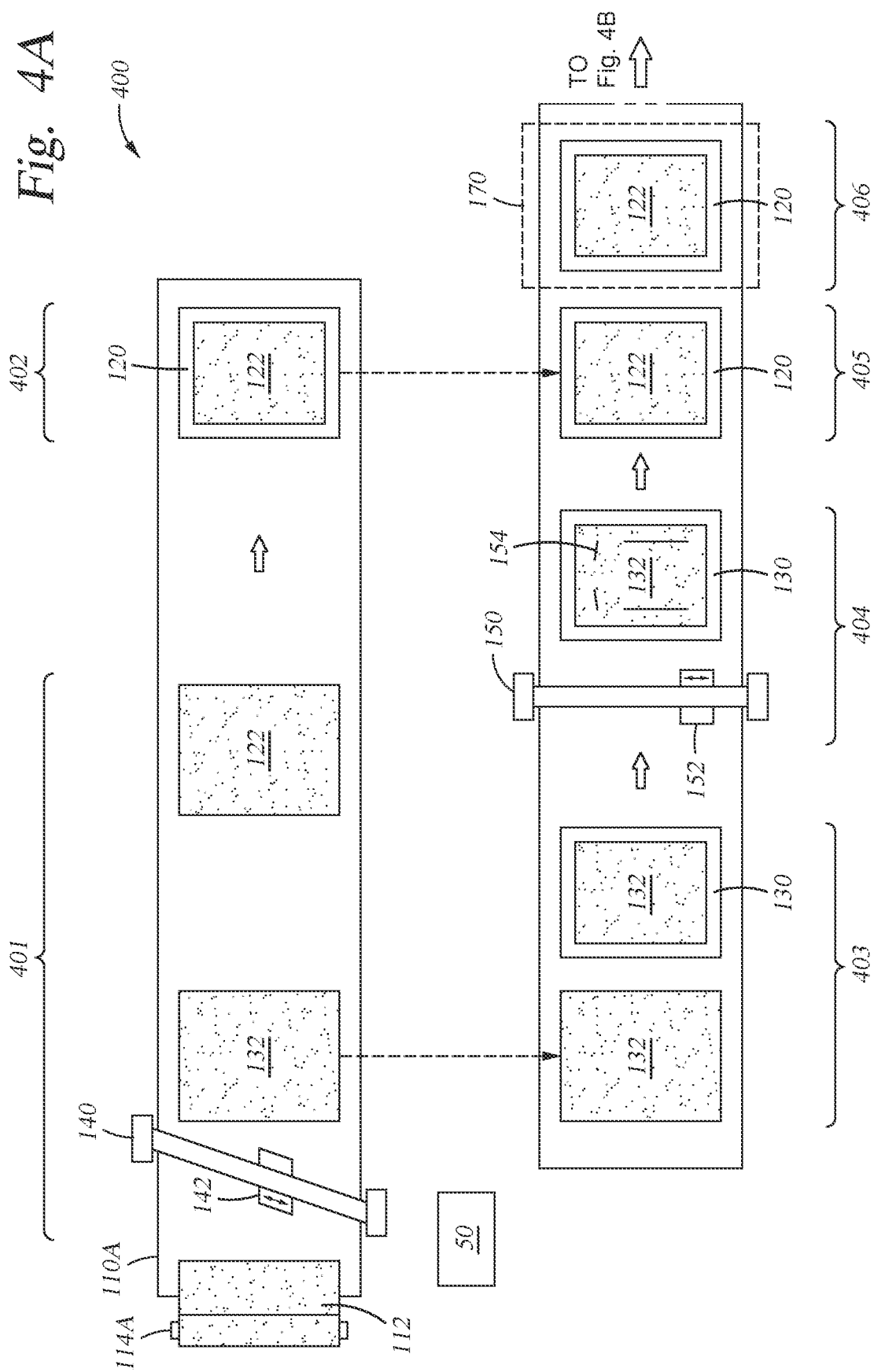

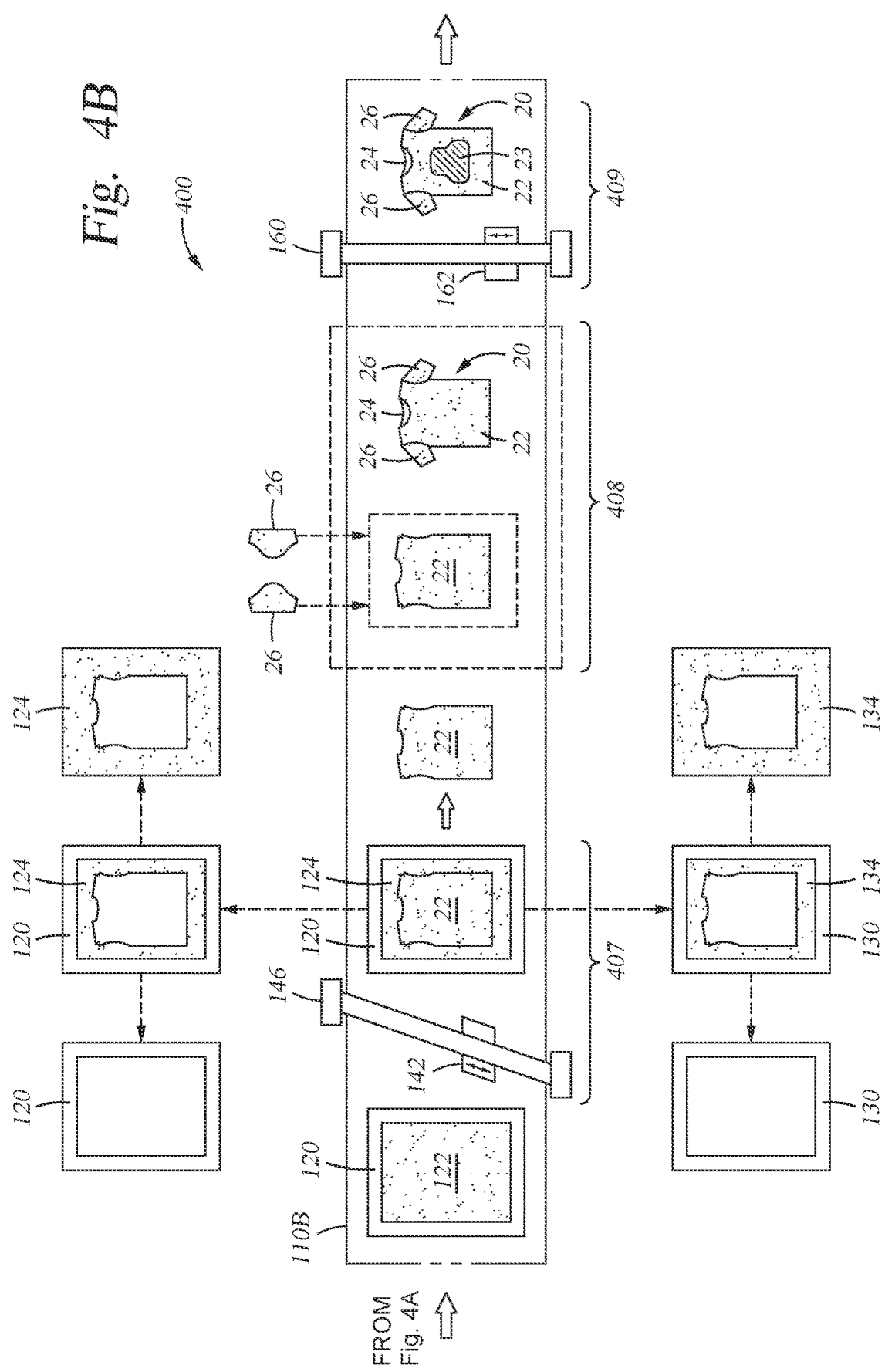

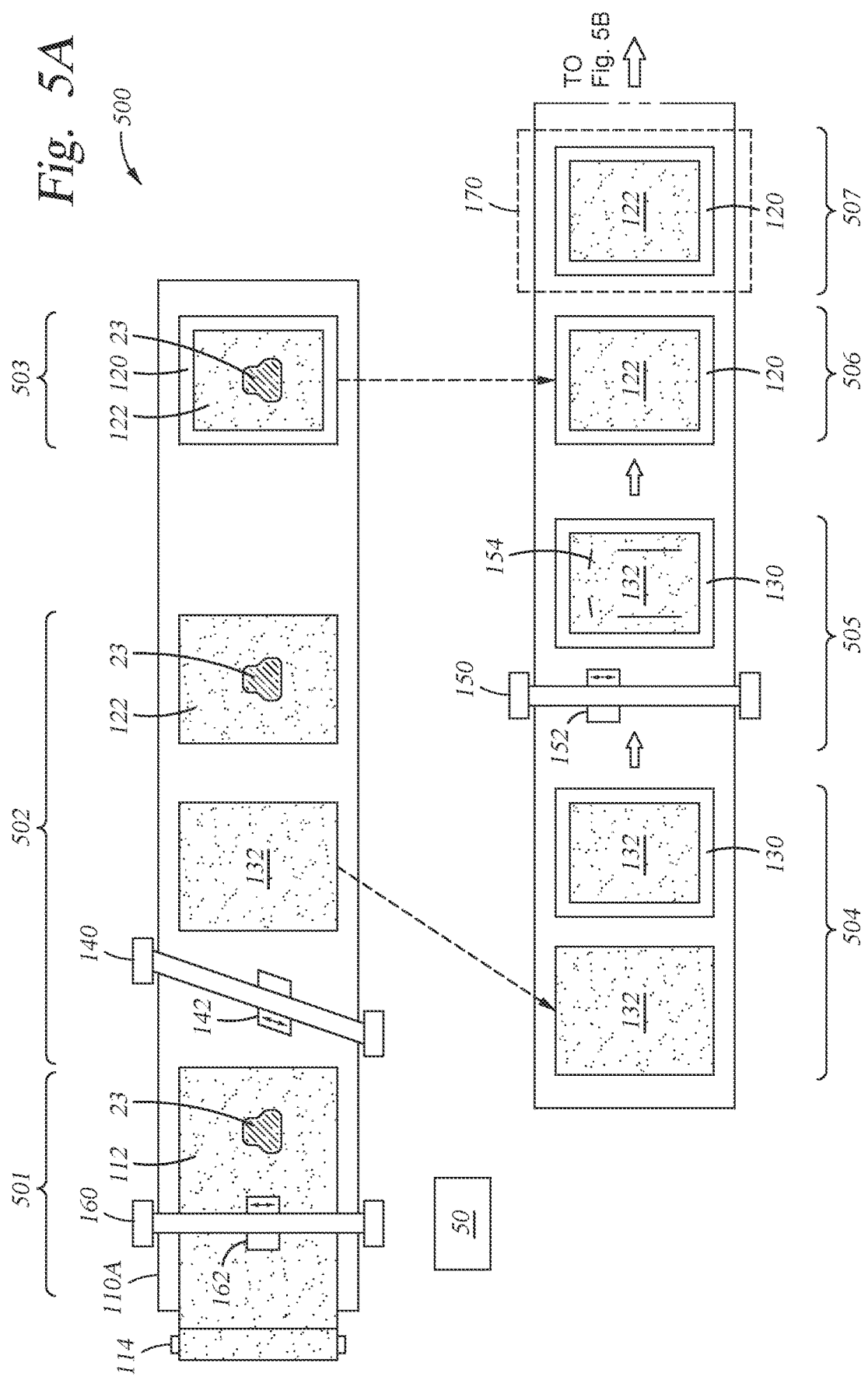

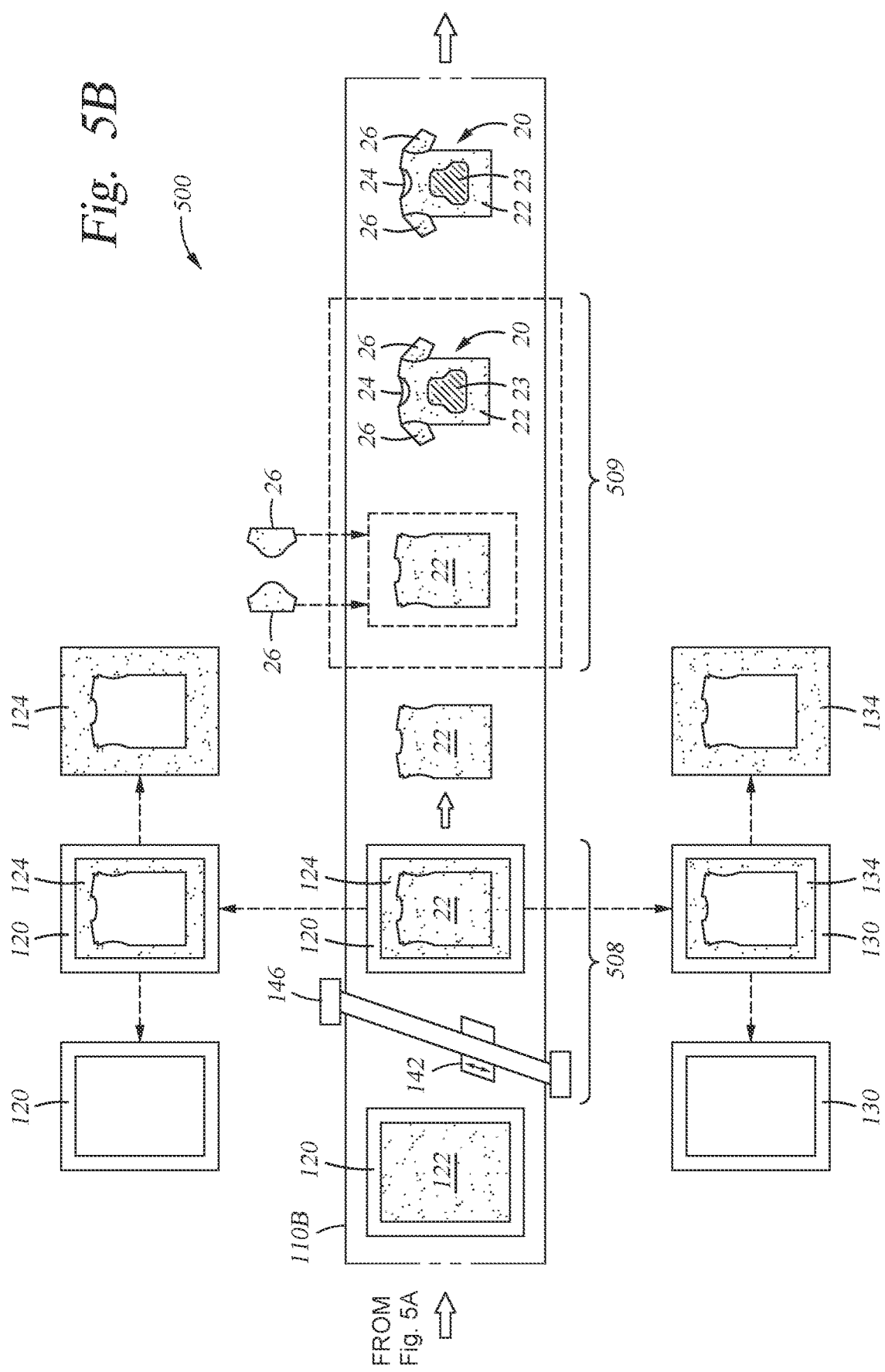

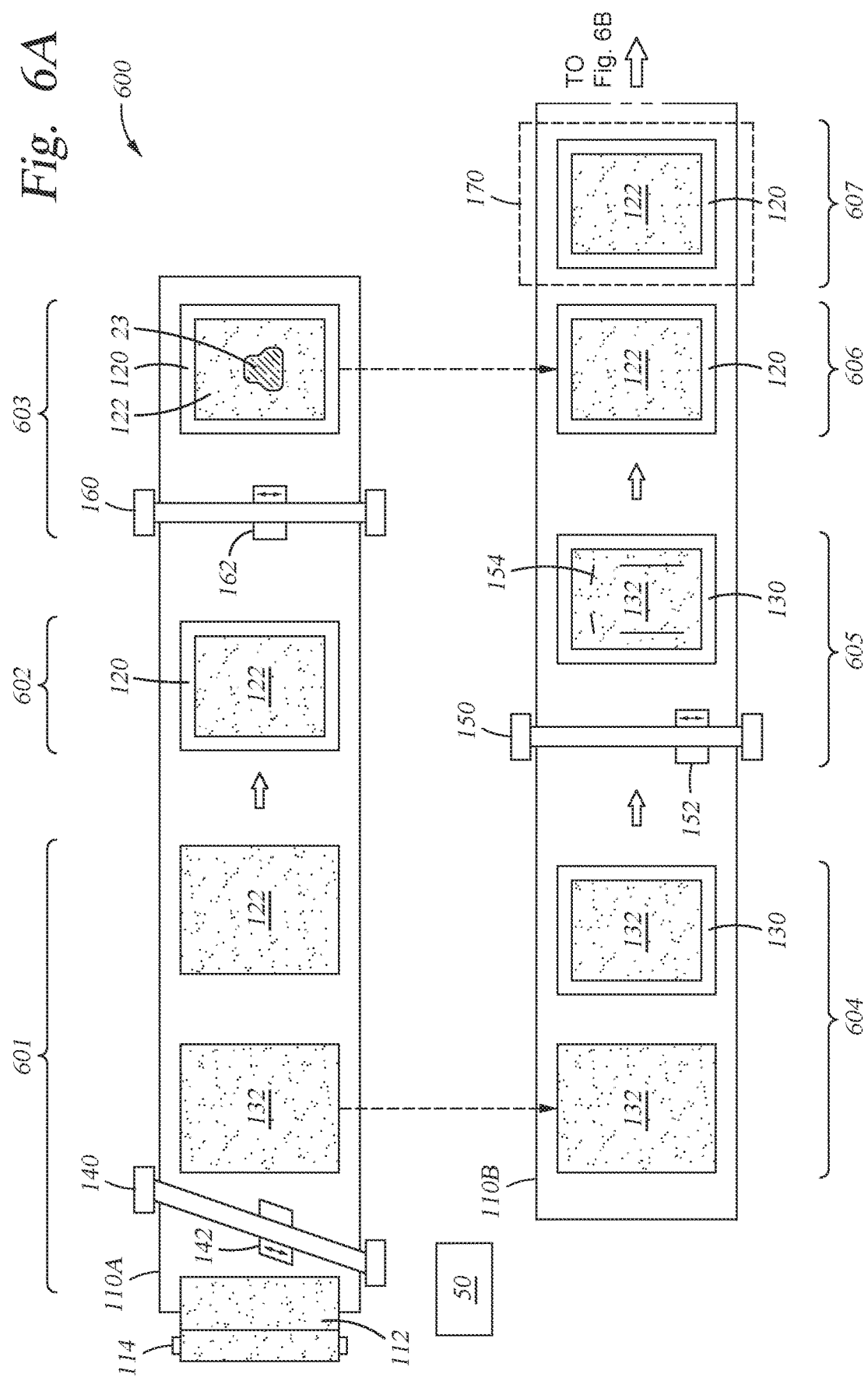

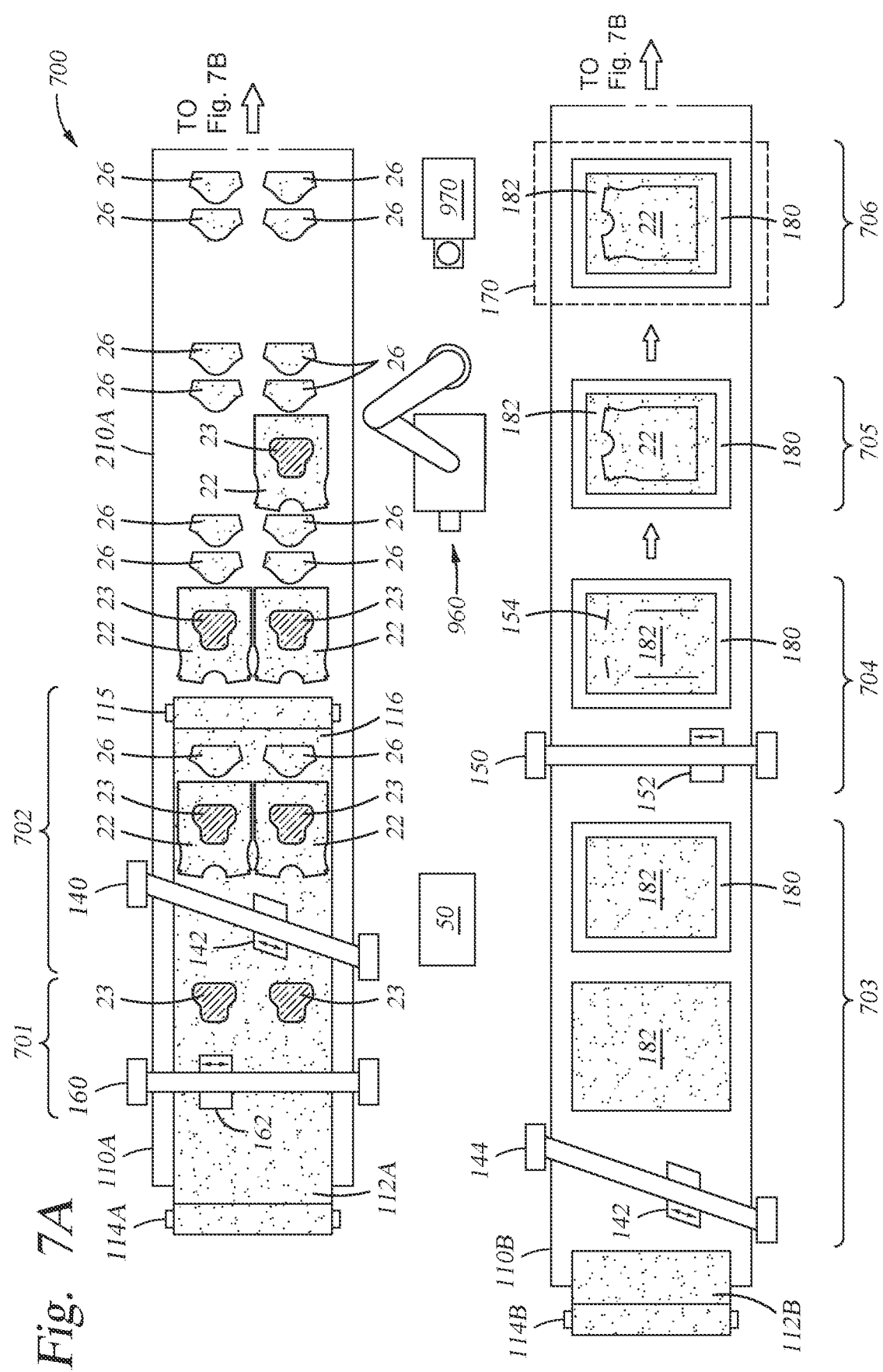

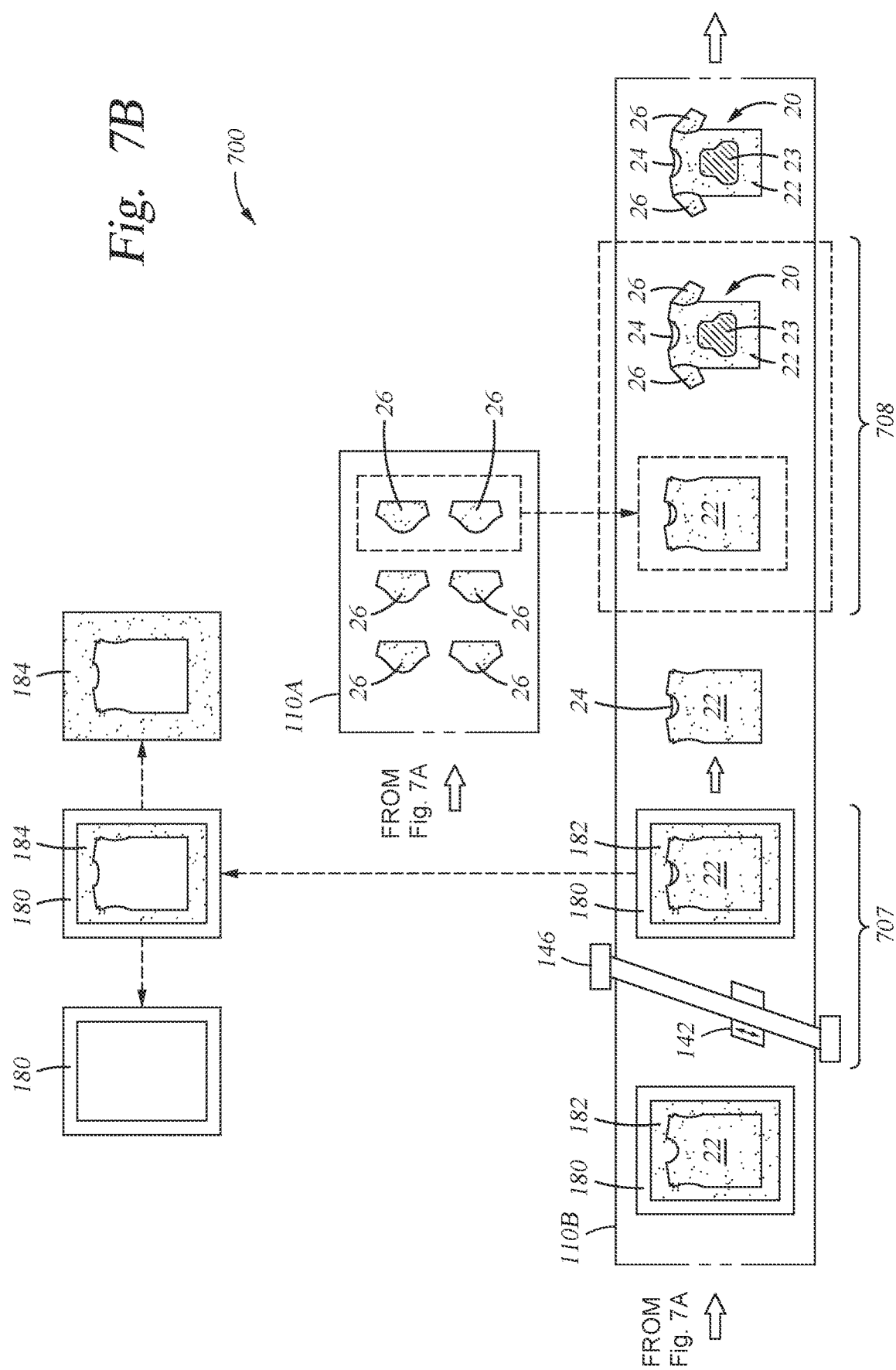

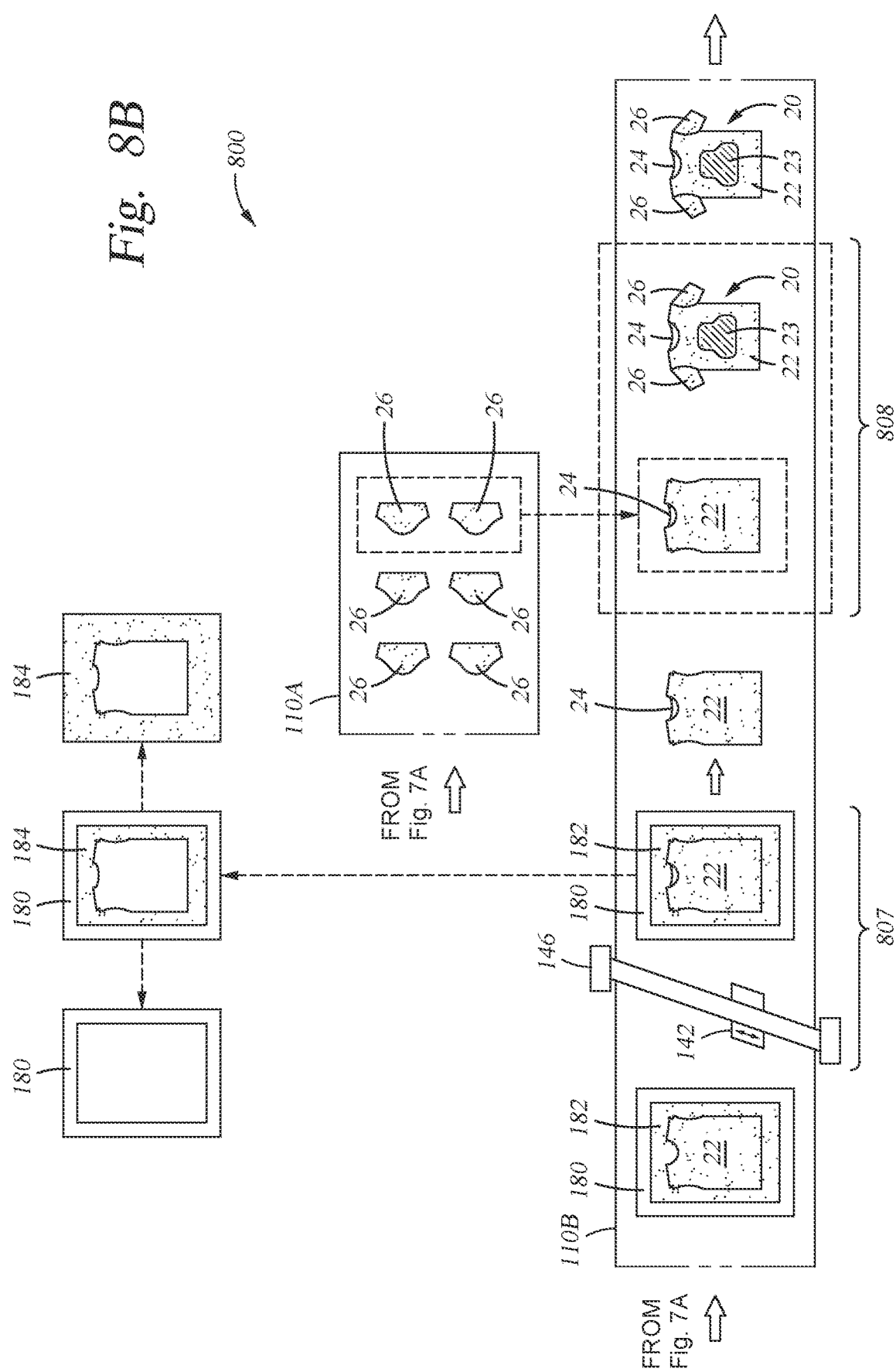

USING A FRAME TO ASSEMBLE A FABRIC ARTICLE

TECHNICAL FIELD

Embodiments presented in this disclosure generally relate to apparatus, systems, and methods for manufacturing fabric articles, such as garments.

BACKGROUND

Despite technological advances and the introduction of automation in many types of manufacturing, the manufacturing of fabric articles, such as garments, remains very labor-intensive. Sewing machines were invented in the early nineteenth century and were made possible based on the development of the lock stitch sewing technique. Today, some hundred and fifty years later, this same technology remains the foundation of garment manufacturing. The modern process of producing large quantities of ready-to-wear apparels relies heavily on manual labor, and remains inefficient relative to other industrial manufacturing processes. Garment manufacturing includes multiple steps including sizing, folding, fitting, cutting, sewing, and material handling. The unique and varied properties of individual fabrics, such as weight, thickness, strength, stretch, and drape, as well as the complex nature of certain tasks, complicates material handling and automated garment manufacturing.

In most small and large apparel manufacturing factories, most of the material handling and apparel manufacturing operations are conducted in a manual or semi-manual manner. The garment manufacturing process may start with laying out a web of fabric for 24 hours to relax the fabric and remove wrinkles. Then, one or more layers of fabric may be cut based on patterns and dimensions matching the desired garment. Then, the cut fabric pieces are transferred from workstation to workstation, where at each workstation, one, two, or more pieces of fabrics are manually folded, overlapped along the seams and fed into a sewing machine or serger machine (also referred to as an overlock machine). Given the variety of fabrics, threads, seam types, and stitch types found in a finished garment, a larger number of workstations with specialized tools and skilled operators is required for assembling a garment. This means the fabrics or unfinished garments spend much time in transit between workstations, which adversely affects the time required to complete a garment. Thus, traditional apparel manufacturing operations may include multiple sequential processes. Further, a time constant may be required between each operation to allow the fabric to relax, which further increases the time required to process a garment.

Despite advances in technology, machines still struggle with performing certain tasks that are easily handled by a trained worker with average hand-eye coordination skills. This is one reason the garment manufacturing industry is in a constant search of cheaper human labor rather than investing in advanced automated manufacturing systems. To increase production, a factory may add additional production lines in parallel, which does little to improve efficiency. Even in large factories, most work is performed in piecemeal fashion with limited coordination between various stations/steps, and movement of material between each station requires a great deal of manual product handling.

Accordingly, there is a need for an automated system for manufacturing garments to improve factory throughput and reduce reliance on manual labor.

SUMMARY

Embodiments presented in this disclosure generally relate to apparatus, systems, and methods for manufacturing fabric articles, such as garments. In one embodiment, a method of manufacturing a fabric article includes unwinding a web of fabric, thereby creating an unwound fabric, and mounting a portion of the unwound fabric in a first frame. The method further includes applying adhesive to the portion of the unwound fabric and positioning a fabric item onto the portion of the unwound fabric, thereby adhering the fabric item to the portion of the unwound fabric. The method further includes then cutting through the portion of the unwound fabric, thereby creating combined first and second components of the fabric article adhered together.

In another embodiment, a method of manufacturing a fabric article includes mounting a fabric portion to a frame, and detecting a fiducial on the frame using a sensor coupled to a controller. The method further includes using the controller to correlate information associated with the fiducial to a set of commands pertaining to an operation to be performed on the fabric portion by accessing a database of preloaded instructions, and selecting commands from the database that correspond to the detected fiducial. The method further includes performing the operation on the fabric portion according to the set of commands while the fabric portion remains mounted to the frame. In another embodiment, the fiducial includes a characteristic feature of the frame. In another embodiment, the method includes detecting a fiducial on or in the fabric portion instead of detecting a fiducial on the frame. In another embodiment, the frame includes a reference point, and the method includes using the reference point to guide a tool performing the operation on the fabric portion.

In another embodiment, a system for use in manufacturing a fabric article includes a frame. The frame includes a base, a faceplate configured to hold a fabric portion onto the base, a fiducial on the faceplate, and a fastener coupling the faceplate to the base such that, in use, at least a section of the fabric portion is sandwiched between the faceplate and the base. The system further includes a controller configured to: receive from the sensor information associated with the fiducial; and control the apparatus to perform the operation on the fabric portion using a set of commands correlated with the information from the sensor.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIGS. 1A and 1B schematically illustrate a system for manufacturing a fabric article.

FIGS. 1C-1E schematically illustrate a system for manufacturing a fabric article.

FIGS. 2A and 2B schematically illustrate a system for manufacturing a fabric article.

FIGS. 3A and 3B schematically illustrate a system for manufacturing a fabric article.

FIGS. 4A and 4B schematically illustrate a system for manufacturing a fabric article.

FIGS. 5A and 5B schematically illustrate a system for manufacturing a fabric article.

FIGS. 6A and 6B schematically illustrate a system for manufacturing a fabric article.

FIGS. 7A and 7B schematically illustrate a system for manufacturing a fabric article.

FIGS. 8A and 8B schematically illustrate a system for manufacturing a fabric article.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 6B:
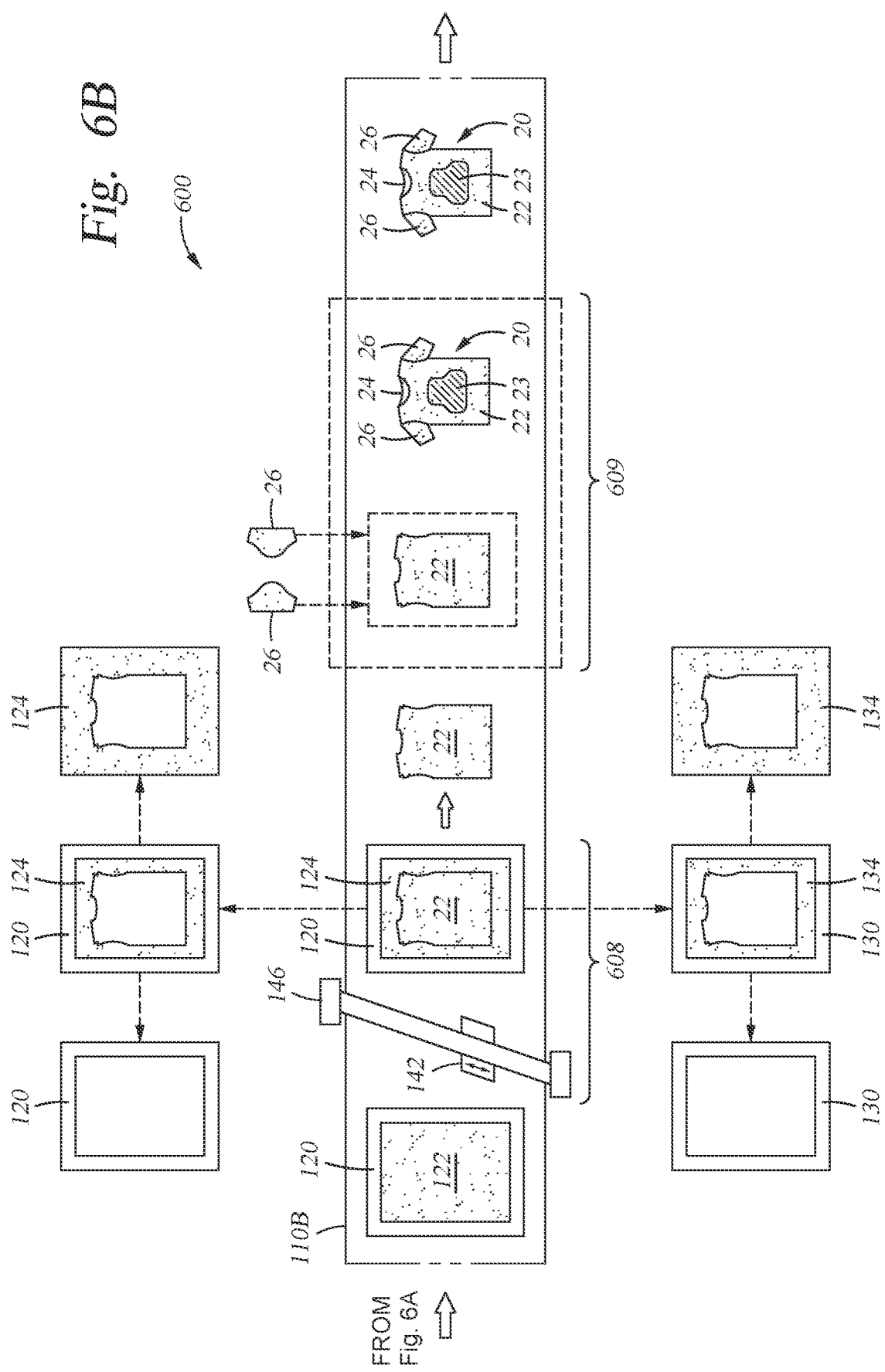

Embodiments presented in this disclosure generally relate to apparatus, systems, and methods for handling fabrics, such as textiles, such as sheet materials, such as leather, cloth, and the like, in the manufacture of articles. Some examples of such articles include, but are not limited to, garments (e.g. shirts, pants, socks, shoes, shorts, coats, jackets, skirts, dresses, underwear, hats, headbands, and the like), accessories (e.g. wallets, purses, and the like), and homewares (e.g. artwork, upholstery, towels, bed linens, blankets, mats, and the like).

Some fabrics (so-called "single-faced fabrics") include a "right side" designated to be on show in the finished article, and a "wrong side" designated to be hidden in the finished article. When such fabrics include a printed design, typically the print is applied to the right side. Additionally, when such fabrics are joined, typically the join is made right side to right side, then the joined fabrics are reversed (for example by turning inside-out) such that excess fabric at the join is hidden, and the right sides become facing outwards from each other. Some other fabrics (so-called "double-faced fabrics") are created with two right sides and no wrong sides. Such fabrics are constructed such that either of the two right sides can be designated to be on show in the finished article. Each system and method of the present disclosure includes the performance of manufacturing operations on fabric items that may be right side facing upwards or wrong side facing upwards. In some embodiments, a manufacturing operation may be performed on a fabric item that is oriented right side facing upwards. In some embodiments, a manufacturing operation may be performed on a fabric item that is oriented wrong side facing upwards.

In the systems of the present disclosure, fabric items are transported to a sequence of stations. In some embodiments, a conveyor transports individual fabric items between stations. In some embodiments, a robot transports individual fabric items between stations. In some embodiments, a robot transports individual fabric items between stations while the individual fabric items are secured in one or more frames. For example, the robot may pick up a frame that is holding a fabric item, and move the frame with the fabric item between stations. The frame may be a vehicle for transporting and handling a corresponding fabric item while the fabric item undergoes one or more operations at one or more stations. At each station one or more operations are performed in the manufacture of a fabric article. The operations are performed on a work surface, such as a cutting table, printing table, and the like. In the Figures, each work surface 110, 110A, 110B represents any appropriate work surface. In some embodiments, at least a portion of the work surface 110, 110A, or 110B may include a conveyor.

In some embodiments, the work surface 110, 110A, 110B is configured to selectively hold and release individual fabric items. In an example, the work surface 110, 110A, 110B includes one or more electrostatic plates. In another example, the work surface 110, 110A, 110B includes a vacuum assembly, such as a perforated plate coupled to a vacuum pump. In some embodiments, operation of the fabric holding mechanism of the work surface 110, 110A, 110B is controlled by a controller, such as the controller 50, described below.

FIGS. 1A and 1B schematically illustrate a system 100 for manufacturing a fabric article. In some embodiments, the system 100 includes a controller 50 for monitoring and controlling the operations of the system 100. The controller 50 may include one or more software applications stored in memory and executed using one or more processors in a computing system. The controller 50 receives data from one or more sensors, such as a camera, a barcode reader, a QR code reader, an RFID tag reader, a proximity sensor, or the like. The one or more sensors are associated with the apparatus of the system 100. The controller 50 processes the data, and directs the operation of one or more pieces of apparatus of the system 100.

A web of a first fabric 112A is unwound, such as from a roller 114A. In some embodiments, the unwinding operation is controlled by the controller 50. The web of first fabric 112A is unwound onto the work surface 110A at station 101—or, after unwinding, is transported to station 101—which includes a cutter 140. The cutter 140 cuts the unwound web of first fabric 112A into one or more first fabric portions 122. In some embodiments, the cutter 140 also makes one or more intermediate cuts 148 in each first fabric portion 122. In an example in which the fabric article is a garment, an intermediate cut may be associated with an eventual seam, neckline, armhole, or hemline of the garment. In some embodiments, the one or more intermediate cuts 148 may be omitted. In some embodiments, the cutter 140 includes a blade on a carrier 142 that is movable with respect to the web of first fabric 112A while cutting the web of first fabric 112A.

In some embodiments, the cutter 140 is controlled by the controller 50. In an example, a sensor associated with the cutter 140 detects a feature of the web of first fabric 112A, such as a printed design or a fiducial on or in the web of first fabric 112A. The controller 50 uses information of the detected feature to direct the cutter 140 to cut the web of first fabric 112A at a specific location of the web of first fabric 112A. In another example, the unwound web of first fabric 112A is positioned such that the cutter 140 cuts a predetermined length of the web of first fabric 112A. The controller

50 directs the positioning of the web of first fabric 112A and the operation of the cutter 140.

Each first fabric portion 122 is mounted to a corresponding first frame 120. An example first frame 120 is described below with respect to FIGS. 9A-9D. In some embodiments, a cutter makes one or more intermediate cuts 148 (such as described above) in each first fabric portion 122 after each first fabric portion 122 is mounted to the corresponding first frame 120. In some embodiments, the cutter making the one or more intermediate cuts 148 in each first fabric portion 122 is controlled by the controller 50. In some embodiments, the one or more intermediate cuts 148 may be omitted.

A web of a second fabric 112B is unwound, such as from a roller 114B. In some embodiments, the unwinding operation is controlled by the controller 50. The web of second fabric 112B is unwound onto the work surface 110B at station 102—or, after unwinding, is transported to station 102—which includes a cutter 144. The cutter 144 cuts the unwound web of second fabric 112B into one or more second fabric portions 132. In some embodiments, the cutter 144 is configured similarly to the cutter 140, described above.

In some embodiments, the cutter 144 is controlled by the controller 50. In an example, a sensor associated with the cutter 144 detects a feature of the web of second fabric 112B, such as a printed design or a fiducial on or in the web of second fabric 112B. The controller 50 uses information of the detected feature to direct the cutter 144 to cut the web of second fabric 112B at a specific location of the web of second fabric 112B. In another example, the unwound web of second fabric 112B is positioned such that the cutter 144 cuts a predetermined length of the web of second fabric 112B. The controller 50 directs the positioning of the web of second fabric 112B and the operation of the cutter 144.

In some embodiments, the cutter 144 also makes one or more intermediate cuts 148 (such as described above) in each second fabric portion 132. In some embodiments, the one or more intermediate cuts 148 may be omitted.

Each second fabric portion 132 is mounted to a corresponding second frame 130. An example second frame 130 is described below with respect to FIGS. 9A-9D. In some embodiments, a cutter makes one or more intermediate cuts 148 (such as described above) in each second fabric portion 132 after each second fabric portion 132 is mounted to the corresponding second frame 130. In some embodiments, the cutter making the one or more intermediate cuts 148 in each second fabric portion 132 is controlled by the controller 50. In some embodiments, the one or more intermediate cuts 148 may be omitted.

The second frame 130 with the second fabric portion 132 is transported to station 103, which includes an adhesive applicator 150. In some embodiments, the adhesive applicator 150 includes a dispensing nozzle on a carrier 152 that is movable with respect to the second fabric portion 132 while dispensing an adhesive 154 onto the second fabric portion 132. The adhesive applicator 150 applies the adhesive 154 onto the second fabric portion 132.

In some embodiments, the adhesive 154 is applied in the form of a liquid deposited onto the second fabric portion 132. In some embodiments, the adhesive 154 permeates at least partially into the fabric of the second fabric portion 132. In some embodiments, the adhesive 154 at least partially remains on a surface of the fabric of the second fabric portion 132. In some embodiments, the adhesive 154 is configured to be cured by any one or more of applying pressure, applying heat, applying moisture, exposing the adhesive to ambient conditions, or waiting for a predetermined duration of time. In some embodiments, the adhesive 154 is deposited onto the second fabric portion 132 in one or more of a continuous line, a non-continuous line, one or more droplets, a single line, or multiple lines. In some embodiments, lines or droplets may be deposited onto the second fabric portion 132 according to one or more of uniform shape, uniform size, uniform separation between adjacent droplets, varying shape, varying size, or varying separation between adjacent droplets. In some embodiments, the adhesive 154 is deposited onto the second fabric portion 132 in a pattern tailored according to any one or more of a desired seam size, a desired seam strength, or a desired accommodation of stretch of the second fabric portion 132 and/or stretch of the first fabric portion 122.

In some embodiments, the adhesive applicator 150 is controlled by the controller 50. In an example, a sensor associated with the adhesive applicator 150 detects a feature of the second fabric portion 132, such as a printed design or a fiducial on or in the second fabric portion 132. In another example, a sensor associated with the adhesive applicator 150 detects a characteristic feature of the second frame 130, such as a characteristic shape or a fiducial (such as fiducial 946, FIG. 9A) of the second frame 130. For instance, the sensor may include one of a camera, a barcode reader, a QR code reader, an RFID tag reader, or a proximity sensor. The controller 50 uses information of the detected feature to direct the adhesive applicator 150 to apply the adhesive 154 at a specific location of the second fabric portion 132.

Figure 10A:
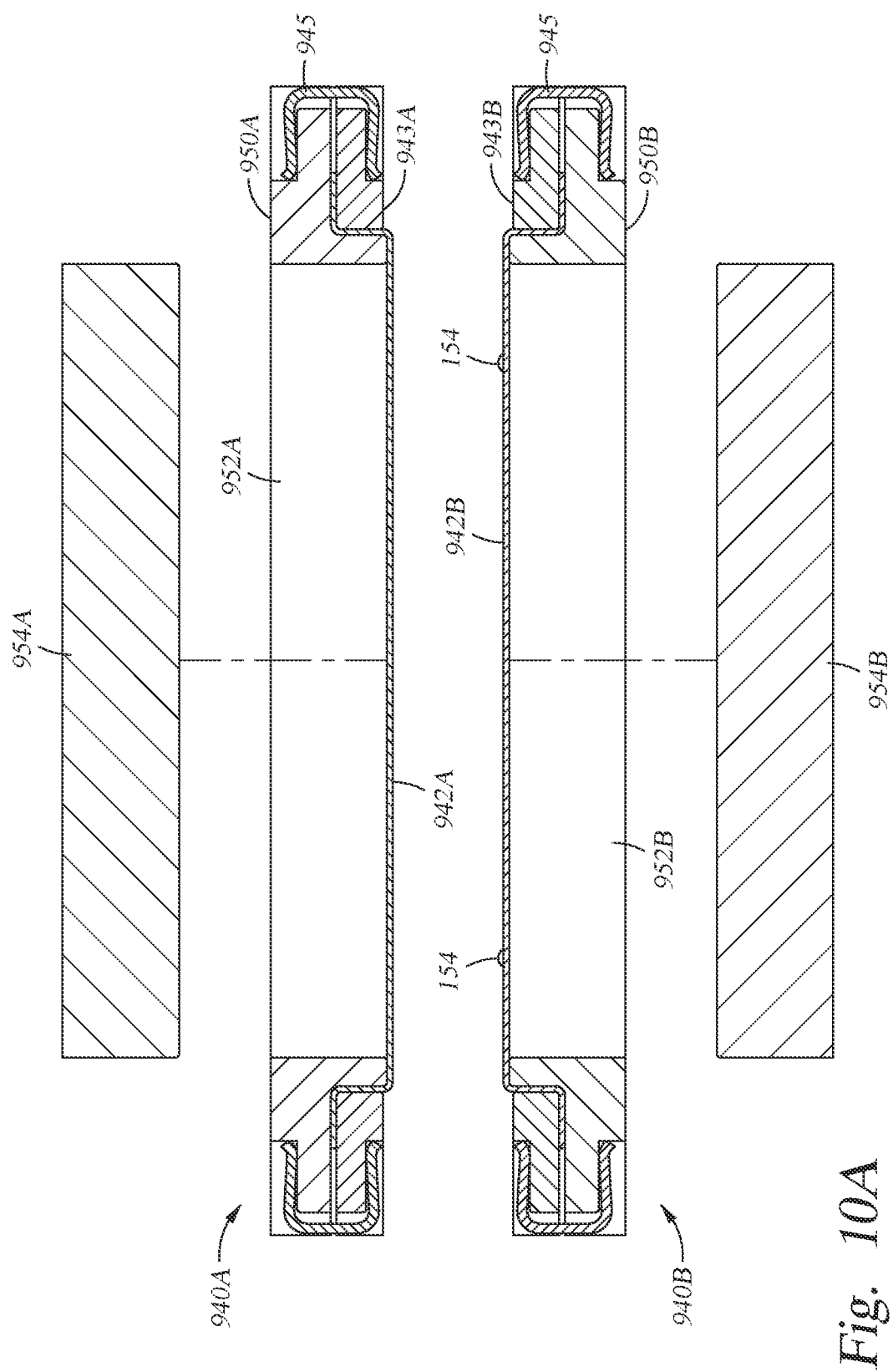
FIGS. 10A and 10B schematically illustrate exemplary configurations of frames for an operation performed by one or more system of the present disclosure.
Figure 10B:
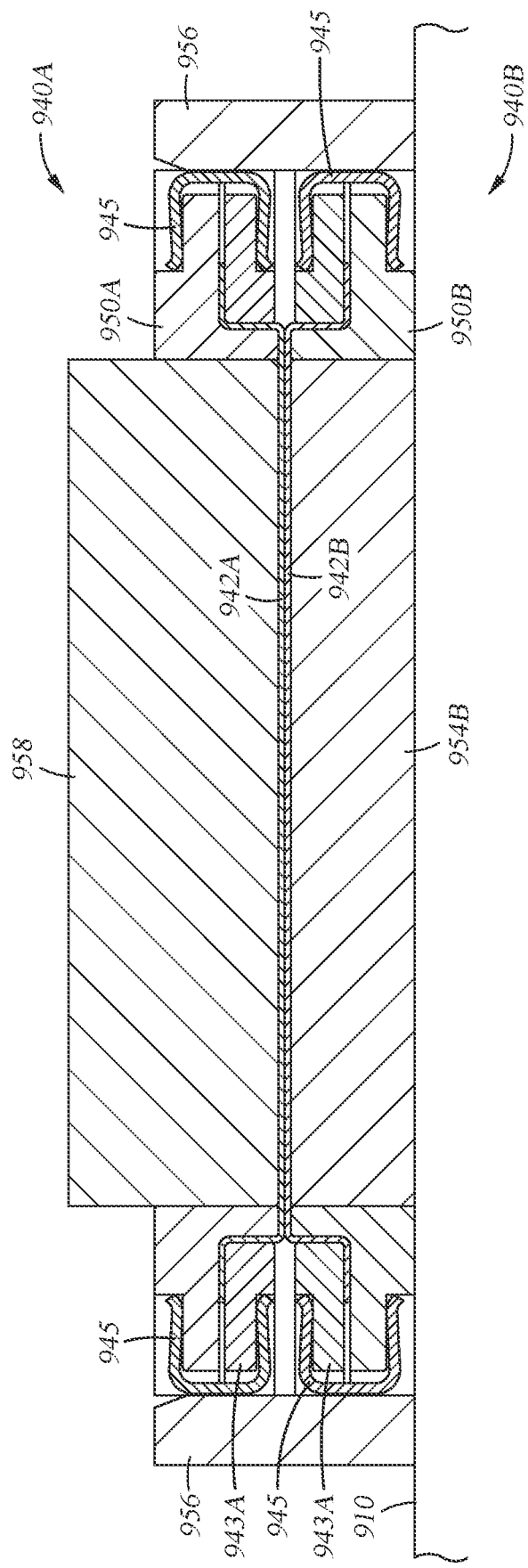

Then the second frame 130 with the second fabric portion 132 is transported to station 104, at which the first fabric portion 122 is brought into contact with the second fabric portion 132 and the adhesive 154. In some embodiments, the first frame 120 with the first fabric portion 122 is positioned on the second frame 130 with the second fabric portion 132. In some embodiments, the second frame 130 with the second fabric portion 132 is positioned on the first frame 120 with the first fabric portion 122. FIGS. 10A and 10B, described below, schematically illustrate exemplary configurations. In some embodiments, the positioning of the first fabric portion 122 with respect to the second fabric portion 132 is achieved by a robot manipulating at least one of the first frame 120 with the first fabric portion 122 or the second frame 130 with the second fabric portion 132. In some embodiments, the positioning of the first fabric portion 122 with respect to the second fabric portion 132 is controlled by the controller 50.

In some embodiments, the adhesive 154 is cured at a curing station 105. After positioning the first fabric portion 122 with respect to the second fabric portion 132, the frames 120, 130 and respective fabric portions 122, 132 are transported to the curing station 105. In an example, the curing station 105 may include curing apparatus 170, such as a heat press, a roller dryer, or a conveyor dryer, which is used to cure the adhesive 154 and bond the first fabric portion 122 to the second fabric portion 132. In some embodiments, the curing apparatus 170 cures the adhesive 154 through the application of one or more of heat, pressure, or moisture.

In some embodiments, the curing apparatus 170 at the curing station 105 is controlled by the controller 50. In an example, a sensor associated with the curing apparatus 170 detects a feature of the first and/or second fabric portion 122, 132 or a fiducial on or in the first and/or second fabric portion 122, 132. In another example, a sensor associated with the curing apparatus 170 detects a feature of the first and/or second frame 120, 130, such as a characteristic shape or a fiducial (such as fiducial 946, FIG. 9A) of the first and/or second frame 120, 130. For instance, the sensor may include one of a camera, a barcode reader, a QR code reader, an RFID tag reader, or a proximity sensor. The controller 50 uses information of the detected feature to direct the curing apparatus 170 to apply the necessary heat and/or pressure to the combined first and second fabric portions 122, 132.

In some embodiments, the adhesive 154 may be cured without necessitating the application of pressure and/or heat. In such embodiments, the curing station 105 may be omitted. Alternatively, the curing station 105 may be present, but unused. In an example, the system 100 may be configured to manufacture fabric articles 20 using an adhesive that requires the application of pressure and/or heat for curing, and may be configured to manufacture fabric articles 20 using an adhesive that does not require the application of pressure and/or heat for curing.

Then the first and second frames 120, 130 with the combined first and second fabric portions 122, 132 are transported to station 106, which includes a cutter 146. In some embodiments, the cutter 146 is configured similarly to the cutter 140, described above. The cutter 146 cuts out a first component 22 of the fabric article 20 from the first fabric portion 122, and cuts out a second component 24 of the fabric article 20 from the second fabric portion 132. The first and second components 22, 24 have been bonded together by the adhesive 154 applied previously at station 103.

In some embodiments, the cutter 146 is controlled by the controller 50. In an example, a sensor associated with the cutter 146 detects a feature of the first and/or second fabric portion 122, 132 or a fiducial on or in the first and/or second fabric portion 122, 132. In another example, a sensor associated with the cutter 146 detects a feature of the first and/or second frame 120, 130, such as a characteristic shape or a fiducial (such as fiducial 946, FIG. 9A) of the first and/or second frame 120, 130. For instance, the sensor may include one of a camera, a barcode reader, a QR code reader, an RFID tag reader, or a proximity sensor. The controller 50 uses information of the detected feature to direct the operation of the cutter 146.

As illustrated, in some embodiments, the first frame 120 and the second frame 130 are removed from the combined first and second components 22, 24 following the above cutting operation by the cutter 146. After cutting out the first and second components 22, 24, a residual piece 124 of the first fabric portion 122 remains in the first frame 120. The residual piece 124 of the first fabric portion 122 is removed from the first frame 120 to be discarded, recycled, or reused. The first frame 120 can be reused. Similarly, a residual piece 134 of the second fabric portion 132 remains in the second frame 130. The residual piece 134 of the second fabric portion 132 is removed from the second frame 130 to be discarded, recycled, or reused. The second frame 130 can be reused.

In some embodiments, at least one of the first frame 120 or the second frame 130 is removed from the combined first and second fabric portions 122, 132 before the cutter 146 is operated to cut out the first component 22 from the first fabric portion 122, and cut out the second component 24 from the second fabric portion 132.

The bonded first and second components 22, 24 are transported to station 107. In some embodiments, one or more additional components 26 of the fabric article 20 are assembled onto the bonded first and second components 22, 24 at station 107. In some embodiments, the station 107 includes apparatus such as that described in U.S. patent application Ser. No. 17/711,347; filed on Apr. 1, 2022; which is incorporated by reference herein in its entirety. In some embodiments, the methods performed at the station 107 include one or more of the methods disclosed in U.S. patent application Ser. No. 17/711,347. In some embodiments, the assembly of the additional components 26 onto the bonded first and second components 22, 24 is controlled by the controller 50. At the station 107, the fabric article 20 formed by the assembled components 22, 24, and 26 (if present) is turned inside-out such that a right side of at least one of the first or second 22, 24 components faces outwards. In some embodiments, the turning inside-out of the fabric article 20 is controlled by the controller 50.

In some embodiments, other finishing operations may be performed at station 107. In an example, one of the first or second 22, 24 components may be trimmed and/or hemmed. For instance, a desired neckline of the first component 22 may be different from a desired neckline of the second 24 component. Cutting the first and second components 22, 24 out from the respective frames 120, 130 at station 106 can result in the first and second components 22, 24 having identical necklines. A finishing operation at station 107 can adjust the neckline of either the first or the second component 22, 24 to produce the desired neckline.

After being turned inside-out, the fabric article 20 is transported to station 108, which includes a printer 160. The printer 160 prints a design 23 onto the fabric article 20. In some embodiments, the printer 160 includes a printhead 132 that is movable with respect to the fabric article 20 while printing the design 23. In some embodiments, such as in the manufacture of fabric articles 20 that do not include a printed design 23, the printing operation may be omitted.

In some embodiments, the printer 160 may include at least one of: a Direct To Garment (DTG) printer, a sublimation printer, or a screen printing printer. In some embodiments, the fabric on which the printing is performed may be a single color fabric, such as white color fabric, and the printer 160 may print on part of or on the entire fabric to dye, colorize, or create a customized color and design pattern. In some embodiments, the printing by the printer 160 may be performed as an on-demand process, based on the requirements of the particular job. In an example, the color(s) and/or pattern(s) applied by the printer 160 are tailored for the manufacture of each individual fabric article 20.

In some embodiments, the printer 160 is controlled by the controller 50. In an example, a sensor associated with the printer 160 detects a feature of the fabric article 20, such as a fiducial on or in the fabric article 20. The controller 50 uses information of the detected feature to direct the printer 160 to print the design 23 at a specific location on the fabric article 20.

In some embodiments, the fabric article 20 is transported to a packaging station at which the fabric article 20 is packaged for further transport. In some embodiments, the packaging of the fabric article 20 is controlled by the controller 50.

FIGS. 1C-1E schematically illustrate a system 100A for manufacturing a fabric article 20. System 100A includes the apparatus of system 100. In some embodiments, the system 100A includes the controller 50 for monitoring and controlling the operations of the system 100A, such as described above for system 100. In such embodiments, the controller 50 may be configured to monitor and control the operations of any one or more of the elements of the system 100A.

A web of a first fabric 112A is unwound, such as from the roller 114A. In some embodiments, the unwinding operation is controlled by the controller 50. The web of first fabric 112A is unwound onto the work surface 110A at station 101A—or, after unwinding, is transported to station 101A—which includes the cutter 140, described above. The cutter 140 cuts the web of first fabric 112A into the one or more first fabric portions 122, as described above. In some embodiments, the cutter 140 also makes one or more intermediate cuts 148 (such as described above) in each first fabric portion 122. In some embodiments, the cutting of the web of first fabric 112A is controlled by the controller 50.

Each first fabric portion 122 is then mounted to a corresponding first frame 120. In some embodiments, a cutter makes one or more intermediate cuts 148 (such as described above) in each first fabric portion 122 after each first fabric portion 122 is mounted to the corresponding first frame 120. In some embodiments, the cutter making the one or more intermediate cuts 148 in each first fabric portion 122 is controlled by the controller 50. In some embodiments, the one or more intermediate cuts 148 may be omitted.

A web of a second fabric 112B is unwound, such as from a roller 114B. In some embodiments, the unwinding operation is controlled by the controller 50. The web of second fabric 1128 is unwound onto the work surface 1108 at station 102A—or, after unwinding, is transported to station 102A—at which a second frame 130 is mounted to the web of second fabric 1126. Each section of the web of second fabric 1126 at which a second frame 130 is mounted is a second fabric portion 132 that will undergo processing to form part of the eventual fabric article 20. At this stage, each second fabric portion 132 remains integral with the web of second fabric 112B.

An example second frame 130 is described below with respect to FIGS. 9A-9D. In some embodiments, the second frame 130 includes a hinge coupling the base 950 and the faceplate 943 (described below, FIGS. 9A-9D) to facilitate the attachment of the web of second fabric 1126 to the second frame 130.

The web of second fabric 1126 with the second frame 130 attached thereto is transported to further stations at which one or more additional processing operations are conducted. In some embodiments, the movement of the second frame 130 from station to station is facilitated by moving the web of second fabric 112B. For example, one or more powered rollers may grip the web of second fabric 112B such that rotation of the one or more rollers pulls the web of second fabric 112B. In some embodiments, the movement of the web of second fabric 1126 from station to station is facilitated by moving the second frame 130. For example, a robot may grasp and move the second frame 130 from station to station. In some embodiments, the movement of the second frame 130 and the web of second fabric 1126 from station to station is facilitated by moving the web of second fabric 112B in combination with moving the second frame 130. In some embodiments, the movement of the second frame 130 and the web of second fabric 1126 from station to station is controlled by the controller 50.

In some embodiments, the web of second fabric 112B with the second frame 130 including the second fabric portion 132 are transported to station 103A, which includes the cutter 144, described above. In some embodiments, the cutter 144 makes one or more intermediate cuts 148 (such as described above) in each second fabric portion 132. In some embodiments, the cutter 144 is controlled by the controller 50. In some embodiments, station 103A, the cutter 144, or the one or more intermediate cuts 148 may be omitted.

The web of second fabric 1126 with the second frame 130 including the second fabric portion 132 are transported to station 104A, which includes an adhesive applicator 150, described above. The adhesive applicator 150 applies the adhesive 154 onto the second fabric portion 132, as described above. In some embodiments, the adhesive applicator 150 is controlled by the controller 50. Then the web of second fabric 1126 with the second frame 130 including the second fabric portion 132 are transported to station 105A, at which the first fabric portion 122 is brought into contact with the second fabric portion 132 and the adhesive 154, as described above. In some embodiments, the side of first fabric portion 122 on which a design is to be printed is positioned to face the side of the second fabric portion 132 on which the adhesive 154 has been applied. In some embodiments, the positioning of the first fabric portion 122 with respect to the second fabric portion 132 is controlled by the controller 50.

Then, in some embodiments, the web of second fabric 1126 with the frames 120, 130 and respective fabric portions 122, 132 are transported to a curing station 106A, at which the adhesive 154 is cured. The curing station 106A includes the above-described curing apparatus 170. As described above, the curing apparatus 170 is operated to cure the adhesive 154 to bond the first fabric portion 122 to the second fabric portion 132. In some embodiments, the curing apparatus 170 is controlled by the controller 50. As described above, in some embodiments, the curing station 106A may be omitted or may be present but unused.

Then, the web of second fabric 1126 with the frames 120, 130 and the combined first and second fabric portions 122, 132 are transported to station 107A (FIG. 1D) or to station 107B (FIG. 1E). Stations 107A and 107B include the cutter 146, described above, however the operations conducted at station 107A are in a different sequence to the operations conducted at station 107B.

The following comparison of the sequences of operations between station 107A and station 107B starts at FIG. 1D. At station 107A, the cutter 146 cuts out a first component 22 of the fabric article 20 from the first fabric portion 122, and cuts out a second component 24 of the fabric article 20 from the second fabric portion 132. In some embodiments, the cutter 146 is controlled by the controller 50. The first and second components 22, 24 have been bonded together by the adhesive 154 applied previously at station 104A.

After cutting out the first and second components 22, 24, the first frame 120 and the second frame 130 are removed from the web of second fabric 112B. The first frame 120 and the second frame 130 can be reused. A residual piece 124 of the first fabric portion 122 remains in the first frame 120. The residual piece 124 of the first fabric portion 122 is removed from the first frame 120 to be discarded, recycled, or reused.

The portion of the web of second fabric 1126 that is not part of the second component 24 is a web of remainder fabric 116. After the above cutting operation by the cutter 146, the web of remainder fabric 116 is removed from the work surface 1106 while the second component 24 with the first component 22 bonded thereto are maintained on the work surface 1106. In embodiments in which the work surface 1106 is configured to hold the fabric, the second component 24 with the first component 22 bonded thereto are maintained on the work surface 1106 by the holding mechanism of the work surface 1106, such as by the electrostatic plate or vacuum assembly described above. In some embodiments, the web of remainder fabric 116 is removed from the work surface 1106 by winding the web of remainder fabric 116 onto a roller 115. In some embodiments, the removal of the web of remainder fabric 116 from the work surface 1106 is controlled by the controller 50.

The comparison of the sequences of operations between station 107A and station 107B turns now to FIG. 1E. At station 107B, the first frame 120 and the second frame 130 are removed from the web of second fabric 112B before the cutter 146 is operated to cut out the first component 22 from the first fabric portion 122, and cut out the second component 24 from the second fabric portion 132. In some embodiments, the residual piece 124 of the first fabric portion 122 is removed from the web of remainder fabric 116 before the web of remainder fabric 116 is removed from the work surface 110б. In some embodiments, the residual piece 124 of the first fabric portion 122 remains with the web of remainder fabric 116, and is removed from the work surface 110б with the web of remainder fabric 116. As described above, in some embodiments, the web of remainder fabric 116 is removed from the work surface 110б by winding the web of remainder fabric 116 onto a roller 115. In some embodiments, the removal of the web of remainder fabric 116 (with or without the residual piece 124) from the work surface 110б is controlled by the controller 50.

Subsequent operations are illustrated similarly in both FIGS. 1D and 1E. After the operations at station 107A or 107B, the bonded first and second components 22, 24 are transported to station 108A. In some embodiments, one or more additional components 26 of the fabric article 20 are assembled onto the bonded first and second components 22, 24 at station 108A. In some embodiments, the station 108A includes apparatus such as that described in U.S. patent application Ser. No. 17/711,347; filed on Apr. 1, 2022; referenced above. In some embodiments, the methods performed at the station 108A include one or more of the methods disclosed in U.S. patent application Ser. No. 17/711,347. In some embodiments, the assembly of the additional components 26 onto the bonded first and second components 22, 24 is controlled by the controller 50. At the station 108A, the fabric article 20 formed by the assembled components 22, 24, and 26 (if present) is turned inside-out such that a right side of at least one of the first or second 22, 24 components faces outwards. In some embodiments, the turning inside-out of the fabric article 20 is controlled by the controller 50. In some embodiments, other finishing operations, as described above, may be performed at station 108A.

After being turned inside-out, the fabric article 20 is transported to station 109A, which includes the printer 160, described above. The printer 160 prints a design 23 onto the fabric article 20, as described above. In some embodiments, the printing of the design 23 is controlled by the controller 50. In some embodiments, such as in the manufacture of fabric articles 20 that do not include a printed design 23, the printing operation may be omitted.

In some embodiments, the fabric article 20 is transported to a packaging station at which the fabric article 20 is packaged for further transport. In some embodiments, the packaging of the fabric article 20 is controlled by the controller 50.

FIGS. 2A and 2B schematically illustrate a system 200 for manufacturing a fabric article 20. System 200 includes the apparatus of system 100, but is configured to perform operations described above in a different sequence. In some embodiments, the system 200 includes the controller 50 for monitoring and controlling the operations of the system 200, such as described above for system 100. In such embodiments, the controller 50 may be configured to monitor and control the operations of any one or more of the elements of the system 200.

A web of a first fabric 112A is unwound, such as from the roller 114A. In some embodiments, the unwinding operation is controlled by the controller 50. The web of first fabric 112A is unwound onto the work surface 110A at station 201—or, after unwinding, is transported to station 201—which includes the printer 160, described above. The printer 160 prints a design 23 onto the web of first fabric 112A, as described above. In some embodiments, the printing of the design 23 is controlled by the controller 50. In some embodiments, such as in the manufacture of fabric articles 20 that do not include a printed design 23, the printing operation may be omitted.

Then the web of first fabric 112A is transported to station 202, which includes the cutter 140, described above. The cutter 140 cuts the web of first fabric 112A into the one or more first fabric portions 122, as described above. In some embodiments, the cutter 140 also makes one or more intermediate cuts 148 (such as described above) in each first fabric portion 122. In some embodiments, the one or more intermediate cuts 148 may be omitted. In some embodiments, the cutting of the web of first fabric 112A is controlled by the controller 50. As illustrated, in embodiments in which the printer 160 has printed the design 23 onto the web of first fabric 112A at station 201, the first fabric portion 122 may include the portion of the web of first fabric 112A on which the design 23 has been printed.

Each first fabric portion 122 is then mounted to a corresponding first frame 120. In some embodiments, a cutter makes one or more intermediate cuts 148 (such as described above) in each first fabric portion 122 after each first fabric portion 122 is mounted to the corresponding first frame 120. In some embodiments, the cutter making the one or more intermediate cuts 148 in each first fabric portion 122 is controlled by the controller 50. In some embodiments, the one or more intermediate cuts 148 may be omitted.

A web of a second fabric 112B is unwound, such as from a roller 114B. In some embodiments, the unwinding operation is controlled by the controller 50. The web of second fabric 112B is unwound onto the work surface 110B at station 203—or, after unwinding, is transported to station 203—which includes the cutter 144, described above. The cutter 144 cuts the unwound web of second fabric 112B into one or more second fabric portions 132, as described above. In some embodiments, the cutter 144 also makes one or more intermediate cuts 148 (such as described above) in each second fabric portion 132. In some embodiments, the one or more intermediate cuts 148 may be omitted. In some embodiments, the cutting of the web of second fabric 112B is controlled by the controller 50.

Each second fabric portion 132 is mounted to a corresponding second frame 130. In some embodiments, a cutter makes one or more intermediate cuts 148 (such as described above) in each second fabric portion 132 after each second fabric portion 132 is mounted to the corresponding second frame 130. In some embodiments, the cutter making the one or more intermediate cuts 148 in each second fabric portion 132 is controlled by the controller 50. In some embodiments, the one or more intermediate cuts 148 may be omitted.

The second frame 130 with the second fabric portion 132 is transported to station 204, which includes an adhesive applicator 150, described above. The adhesive applicator 150 applies the adhesive 154 onto the second fabric portion 132, as described above. In some embodiments, the adhesive applicator 150 is controlled by the controller 50. Then the second frame 130 with the second fabric portion 132 is transported to station 205, at which the first fabric portion 122 is brought into contact with the second fabric portion 132 and the adhesive 154, as described above. As illustrated, in some embodiments, the side of first fabric portion 122 on which the design 23 has been printed is positioned to face the side of the second fabric portion 132 on which the adhesive 154 has been applied. In some embodiments, the positioning of the first fabric portion 122 with respect to the second fabric portion 132 is controlled by the controller 50.

Then, in some embodiments, the frames 120, 130 and respective fabric portions 122, 132 are transported to a curing station 206, at which the adhesive 154 is cured. The curing station 206 includes the above-described curing apparatus 170. As described above, the curing apparatus 170 is operated to cure the adhesive 154 to bond the first fabric portion 122 to the second fabric portion 132. In some embodiments, the curing apparatus 170 is controlled by the controller 50. As described above, in some embodiments, the curing station 206 may be omitted or may be present but unused.

Then the first and second frames 120, 130 with the combined first and second fabric portions 122, 132 are transported to station 207, which includes the cutter 146, described above. The cutter 146 cuts out a first component 22 of the fabric article 20 from the first fabric portion 122, and cuts out a second component 24 of the fabric article 20 from the second fabric portion 132. In some embodiments, the cutter 146 is controlled by the controller 50. The first and second components 22, 24 have been bonded together by the adhesive 154 applied previously at station 204.

As illustrated, in some embodiments, the first frame 120 and the second frame 130 are removed from the combined first and second components 22, 24 following the above cutting operation by the cutter 146. After cutting out the first and second components 22, 24, a residual piece 124 of the first fabric portion 122 remains in the first frame 120. The residual piece 124 of the first fabric portion 122 is removed from the first frame 120 to be discarded, recycled, or reused. The first frame 120 can be reused. Similarly, a residual piece 134 of the second fabric portion 132 remains in the second frame 130. The residual piece 134 of the second fabric portion 132 is removed from the second frame 130 to be discarded, recycled, or reused. The second frame 130 can be reused.

In some embodiments, at least one of the first frame 120 or the second frame 130 is removed from the combined first and second fabric portions 122, 132 before the cutter 146 is operated to cut out the first component 22 from the first fabric portion 122, and cut out the second component 24 from the second fabric portion 132.

The bonded first and second components 22, 24 are transported to station 208. In some embodiments, one or more additional components 26 of the fabric article 20 are assembled onto the bonded first and second components 22, 24 at station 208. In some embodiments, the station 208 includes apparatus such as that described in U.S. patent application Ser. No. 17/711,347; filed on Apr. 1, 2022; referenced above. In some embodiments, the methods performed at the station 208 include one or more of the methods disclosed in U.S. patent application Ser. No. 17/711,347. In some embodiments, the assembly of the additional components 26 onto the bonded first and second components 22, 24 is controlled by the controller 50. At the station 208, the fabric article 20 formed by the assembled components 22, 24, and 26 (if present) is turned inside-out such that a right side of at least one of the first or second 22, 24 components faces outwards. As illustrated, in some embodiments, the fabric article 20 is manipulated such that the printed design 23 faces outwards. In some embodiments, the turning inside-out of the fabric article 20 is controlled by the controller 50. In some embodiments, other finishing operations, as described above, may be performed at station 208.

In some embodiments, the fabric article 20 is transported to a packaging station at which the fabric article 20 is packaged for further transport. In some embodiments, the packaging of the fabric article 20 is controlled by the controller 50.

FIGS. 3A and 3B schematically illustrate a system 300 for manufacturing a fabric article 20. System 300 includes the apparatus of system 100, but is configured to perform operations described above in a different sequence. In some embodiments, the system 300 includes the controller 50 for monitoring and controlling the operations of the system 300, such as described above for any of systems 100, 100A, or 200. In such embodiments, the controller 50 may be configured to monitor and control the operations of any one or more of the elements of the system 300.

A web of a first fabric 112A is unwound, such as from the roller 114A. In some embodiments, the unwinding operation is controlled by the controller 50. The web of first fabric 112A is unwound onto the work surface 110A at station 301—or, after unwinding, is transported to station 301—which includes the cutter 140, described above. The cutter 140 cuts the web of first fabric 112A into the one or more first fabric portions 122, as described above. In some embodiments, the cutter 140 also makes one or more intermediate cuts 148 (such as described above) in each first fabric portion 122. In some embodiments, the one or more intermediate cuts 148 may be omitted. In some embodiments, the cutting of the web of first fabric 112A is controlled by the controller 50.

Each first fabric portion 122 is then mounted to a corresponding first frame 120. In some embodiments, a cutter makes one or more intermediate cuts 148 (such as described above) in each first fabric portion 122 after each first fabric portion 122 is mounted to the corresponding first frame 120. In some embodiments, the cutter making the one or more intermediate cuts 148 in each first fabric portion 122 is controlled by the controller 50. In some embodiments, the one or more intermediate cuts 148 may be omitted.

Then the first frame 120 with the first fabric portion 122 is transported to station 302, which includes the printer 160, described above. The printer 160 prints a design 23 onto the first fabric portion 122. In some embodiments, the printing of the design 23 is controlled by the controller 50. In an example, a sensor associated with the printer 160 detects a feature of the first fabric portion 122, such as a fiducial on or in the first fabric portion 122. In another example, a sensor associated with the printer 160 detects a feature of the first frame 120, such as a characteristic shape or a fiducial (such as fiducial 946, FIG. 9A) of the first frame 120. For instance, the sensor may include one of a camera, a barcode reader, a QR code reader, an RFID tag reader, or a proximity sensor. The controller 50 uses information of the detected feature to direct the printer 160 to print the design 23 at a specific location on the first fabric portion 122. In some embodiments, such as in the manufacture of fabric articles 20 that do not include a printed design 23, the printing operation may be omitted.

A web of a second fabric 112B is unwound, such as from a roller 114B. In some embodiments, the unwinding operation is controlled by the controller 50. The web of second fabric 112B is unwound onto the work surface 110B at station 303—or, after unwinding, is transported to station 303—which includes the cutter 144, described above. The cutter 144 cuts the unwound web of second fabric 112B into one or more second fabric portions 132, as described above. In some embodiments, the cutter 144 also makes one or more intermediate cuts 148 (such as described above) in each second fabric portion 132. In some embodiments, the one or more intermediate cuts 148 may be omitted. In some embodiments, the cutting of the web of second fabric 1128 is controlled by the controller 50.

Each second fabric portion 132 is mounted to a corresponding second frame 130. In some embodiments, a cutter makes one or more intermediate cuts 148 (such as described above) in each second fabric portion 132 after each second fabric portion 132 is mounted to the corresponding second frame 130. In some embodiments, the cutter making the one or more intermediate cuts 148 in each second fabric portion 132 is controlled by the controller 50. In some embodiments, the one or more intermediate cuts 148 may be omitted.

The second frame 130 with the second fabric portion 132 is transported to station 304, which includes an adhesive applicator 150, described above. The adhesive applicator 150 applies the adhesive 154 onto the second fabric portion 132, as described above. In some embodiments, the adhesive applicator 150 is controlled by the controller 50. Then the second frame 130 with the second fabric portion 132 is transported to station 305, at which the first fabric portion 122 is brought into contact with the second fabric portion 132 and the adhesive 154, as described above. As illustrated, in some embodiments, the side of first fabric portion 122 on which the design 23 has been printed is positioned to face the side of the second fabric portion 132 on which the adhesive 154 has been applied. In some embodiments, the positioning of the first fabric portion 122 with respect to the second fabric portion 132 is controlled by the controller 50.

Then, in some embodiments, the frames 120, 130 and respective fabric portions 122, 132 are transported to a curing station 306, at which the adhesive 154 is cured. The curing station 206 includes the above-described curing apparatus 170. As described above, the curing apparatus 170 is operated to cure the adhesive 154 to bond the first fabric portion 122 to the second fabric portion 132. In some embodiments, the curing apparatus 170 is controlled by the controller 50. As described above, in some embodiments, the curing station 306 may be omitted or may be present but unused.

Then the first and second frames 120, 130 with the combined first and second fabric portions 122, 132 are transported to station 307, which includes the cutter 146, described above. The cutter 146 cuts out a first component 22 of the fabric article 20 from the first fabric portion 122, and cuts out a second component 24 of the fabric article 20 from the second fabric portion 132. In some embodiments, the cutter 146 is controlled by the controller 50. The first and second components 22, 24 have been bonded together by the adhesive 154 applied previously at station 304.

As illustrated, in some embodiments, the first frame 120 and the second frame 130 are removed from the combined first and second components 22, 24 following the above cutting operation by the cutter 146. After cutting out the first and second components 22, 24, a residual piece 124 of the first fabric portion 122 remains in the first frame 120. The residual piece 124 of the first fabric portion 122 is removed from the first frame 120 to be discarded, recycled, or reused. The first frame 120 can be reused. Similarly, a residual piece 134 of the second fabric portion 132 remains in the second frame 130. The residual piece 134 of the second fabric portion 132 is removed from the second frame 130 to be discarded, recycled, or reused. The second frame 130 can be reused.

In some embodiments, at least one of the first frame 120 or the second frame 130 is removed from the combined first and second fabric portions 122, 132 before the cutter 146 is operated to cut out the first component 22 from the first fabric portion 122, and cut out the second component 24 from the second fabric portion 132.

The bonded first and second components 22, 24 are transported to station 308. In some embodiments, one or more additional components 26 of the fabric article 20 are assembled onto the bonded first and second components 22, 24 at station 308. In some embodiments, the station 308 includes apparatus such as that described in U.S. patent application Ser. No. 17/711,347; filed on Apr. 1, 2022; referenced above. In some embodiments, the methods performed at the station 308 include one or more of the methods disclosed in U.S. patent application Ser. No. 17/711,347. In some embodiments, the assembly of the additional components 26 onto the bonded first and second components 22, 24 is controlled by the controller 50. At the station 308, the fabric article 20 formed by the assembled components 22, 24, and 26 (if present) is turned inside-out such that a right side of at least one of the first or second 22, 24 components faces outwards. As illustrated, in some embodiments, the fabric article 20 is manipulated such that the printed design 23 faces outwards. In some embodiments, the turning inside-out of the fabric article 20 is controlled by the controller 50. In some embodiments, other finishing operations, as described above, may be performed at station 308.

In some embodiments, the fabric article 20 is transported to a packaging station at which the fabric article 20 is packaged for further transport. In some embodiments, the packaging of the fabric article 20 is controlled by the controller 50.

FIGS. 4A and 4B schematically illustrate a system 400 for manufacturing a fabric article 20. System 400 includes the apparatus of system 100, but is configured to perform operations described above in a different sequence. In some embodiments, the system 400 includes the controller 50 for monitoring and controlling the operations of the system 400, such as described above for any of systems 100, 100A, 200, or 300. In such embodiments, the controller 50 may be configured to monitor and control the operations of any one or more of the elements of the system 400.

A single web of fabric 112 is unwound, such as from the roller 114. In some embodiments, the unwinding operation is controlled by the controller 50. The web of fabric 112 is unwound onto the work surface 110A at station 401—or, after unwinding, is transported to station 401—which includes the cutter 140, described above. The cutter 140 cuts the unwound web of fabric 112 into one or more first fabric portions 122 and one or more second fabric portions 132, as described above. In some embodiments, the cutter 140 also makes one or more intermediate cuts 148 (such as described above) in each first fabric portion 122 or in each second fabric portion 132. In some embodiments, the one or more intermediate cuts 148 may be omitted. In some embodiments, the cutting of the web of fabric 112 is controlled by the controller 50.

Each first fabric portion 122 is transported to station 402, at which each first fabric portion 122 is mounted to a corresponding first frame 120. Each second fabric portion 132 is transported to station 403, represented by the work surface 1108, at which each second fabric portion 132 is mounted to a corresponding second frame 130.

In some embodiments, a cutter makes one or more intermediate cuts 148 (such as described above) in each first fabric portion 122 after each first fabric portion 122 is mounted to the corresponding first frame 120. In some embodiments, the cutter making the one or more intermediate cuts 148 in each first fabric portion 122 is controlled by the controller 50. In some embodiments, the one or more intermediate cuts 148 may be omitted.

In some embodiments, a cutter makes one or more intermediate cuts 148 (such as described above) in each second fabric portion 132 after each second fabric portion 132 is mounted to the corresponding second frame 130. In some embodiments, the cutter making the one or more intermediate cuts 148 in each second fabric portion 132 is controlled by the controller 50. In some embodiments, the one or more intermediate cuts 148 may be omitted.

The second frame 130 with the second fabric portion 132 is transported to station 404, which includes an adhesive applicator 150, described above. The adhesive applicator 150 applies the adhesive 154 onto the second fabric portion 132, as described above. In some embodiments, the adhesive applicator 150 is controlled by the controller 50. Then the second frame 130 with the second fabric portion 132 is transported to station 405, at which the first fabric portion 122 is brought into contact with the second fabric portion 132 and the adhesive 154, as described above. In some embodiments, the positioning of the first fabric portion 122 with respect to the second fabric portion 132 is controlled by the controller 50.

Then, in some embodiments, the frames 120, 130 and respective fabric portions 122, 132 are transported to a curing station 406, at which the adhesive 154 is cured. The curing station 406 includes the above-described curing apparatus 170. As described above, the curing apparatus 170 is operated to cure the adhesive 154 to bond the first fabric portion 122 to the second fabric portion 132. In some embodiments, the curing apparatus 170 is controlled by the controller 50. As described above, in some embodiments, the curing station 406 may be omitted or may be present but unused.

Then the first and second frames 120, 130 with the combined first and second fabric portions 122, 132 are transported to station 407, which includes the cutter 146, described above. The cutter 146 cuts out a first component 22 of the fabric article 20 from the first fabric portion 122, and cuts out a second component 24 of the fabric article 20 from the second fabric portion 132. In some embodiments, the cutter 146 is controlled by the controller 50. The first and second components 22, 24 have been bonded together by the adhesive 154 applied previously at station 404.

As illustrated, in some embodiments, the first frame 120 and the second frame 130 are removed from the combined first and second components 22, 24 following the above cutting operation by the cutter 146. After cutting out the first and second components 22, 24, a residual piece 124 of the first fabric portion 122 remains in the first frame 120. The residual piece 124 of the first fabric portion 122 is removed from the first frame 120 to be discarded, recycled, or reused. The first frame 120 can be reused. Similarly, a residual piece 134 of the second fabric portion 132 remains in the second frame 130. The residual piece 134 of the second fabric portion 132 is removed from the second frame 130 to be discarded, recycled, or reused. The second frame 130 can be reused.

In some embodiments, at least one of the first frame 120 or the second frame 130 is removed from the combined first and second fabric portions 122, 132 before the cutter 146 is operated to cut out the first component 22 from the first fabric portion 122, and cut out the second component 24 from the second fabric portion 132.

The bonded first and second components 22, 24 are transported to station 408. In some embodiments, one or more additional components 26 of the fabric article 20 are assembled onto the bonded first and second components 22, 24 at station 408. In some embodiments, the station 408 includes apparatus such as that described in U.S. patent application Ser. No. 17/711,347; filed on Apr. 1, 2022; referenced above. In some embodiments, the methods performed at the station 408 include one or more of the methods disclosed in U.S. patent application Ser. No. 17/711,347. In some embodiments, the assembly of the additional components 26 onto the bonded first and second components 22, 24 is controlled by the controller 50. At the station 408, the fabric article 20 formed by the assembled components 22, 24, and 26 (if present) is turned inside-out such that a right side of at least one of the first or second 22, 24 components faces outwards. In some embodiments, the turning inside-out of the fabric article 20 is controlled by the controller 50. In some embodiments, other finishing operations, as described above, may be performed at station 408.

After being turned inside-out, the fabric article 20 is transported to station 409, which includes the printer 160, described above. The printer 160 prints a design 23 onto the fabric article 20, as described above. In some embodiments, the printing of the design 23 is controlled by the controller 50. In some embodiments, such as in the manufacture of fabric articles 20 that do not include a printed design 23, the printing operation may be omitted.

In some embodiments, the fabric article 20 is transported to a packaging station at which the fabric article 20 is packaged for further transport. In some embodiments, the packaging of the fabric article 20 is controlled by the controller 50.

FIGS. 5A and 5B schematically illustrate a system 500 for manufacturing a fabric article 20. System 500 includes the apparatus of system 100, but is configured to perform operations described above in a different sequence. In some embodiments, the system 500 includes the controller 50 for monitoring and controlling the operations of the system 500, such as described above for any of systems 100, 100A, 200, 300, or 400. In such embodiments, the controller 50 may be configured to monitor and control the operations of any one or more of the elements of the system 500.

A single web of fabric 112 is unwound, such as from the roller 114. In some embodiments, the unwinding operation is controlled by the controller 50. The web of fabric 112 is unwound onto the work surface 110A at station 501—or, after unwinding, is transported to station 501—which includes the printer 160, described above. The printer 160 prints a design 23 onto the web of fabric 112, as described above. In some embodiments, the printing of the design 23 is controlled by the controller 50. In some embodiments, such as in the manufacture of fabric articles 20 that do not include a printed design 23, the printing operation may be omitted.

Then the web of fabric 112 is transported to station 502, which includes the cutter 140, described above. The cutter 140 cuts the web of fabric 112 into one or more first fabric portions 122 and one or more second fabric portions 132, as described above. In some embodiments, the cutter 140 also makes one or more intermediate cuts 148 (such as described above) in each first fabric portion 122 or in each second fabric portion 132. In some embodiments, the one or more intermediate cuts 148 may be omitted. As illustrated, in embodiments in which the printer 160 has printed the design 23 onto the web of fabric 112 at station 501, the first fabric portion 122 may include the portion of the web of fabric 112 on which the design 23 has been printed. In some embodiments, the cutting of the web of fabric 112 is controlled by the controller 50.

Each first fabric portion 122 is transported to station 503, at which each first fabric portion 122 is mounted to a corresponding first frame 120. Each second fabric portion 132 is transported to station 504, represented by work surface 110б, at which each second fabric portion 132 is mounted to a corresponding second frame 130.

In some embodiments, a cutter makes one or more intermediate cuts 148 (such as described above) in each first fabric portion 122 after each first fabric portion 122 is mounted to the corresponding first frame 120. In some embodiments, the cutter making the one or more intermediate cuts 148 in each first fabric portion 122 is controlled by the controller 50. In some embodiments, the one or more intermediate cuts 148 may be omitted.

In some embodiments, a cutter makes one or more intermediate cuts 148 (such as described above) in each second fabric portion 132 after each second fabric portion 132 is mounted to the corresponding second frame 130. In some embodiments, the cutter making the one or more intermediate cuts 148 in each second fabric portion 132 is controlled by the controller 50. In some embodiments, the one or more intermediate cuts 148 may be omitted.

The second frame 130 with the second fabric portion 132 is transported to station 505, which includes an adhesive applicator 150, described above. The adhesive applicator 150 applies the adhesive 154 onto the second fabric portion 132, as described above. In some embodiments, the adhesive applicator 150 is controlled by the controller 50. Then the second frame 130 with the second fabric portion 132 is transported to station 506, at which the first fabric portion 122 is brought into contact with the second fabric portion 132 and the adhesive 154, as described above. As illustrated, in some embodiments, the side of first fabric portion 122 on which the design 23 has been printed is positioned to face the side of the second fabric portion 132 on which the adhesive 154 has been applied. In some embodiments, the positioning of the first fabric portion 122 with respect to the second fabric portion 132 is controlled by the controller 50.

Then, in some embodiments, the frames 120, 130 and respective fabric portions 122, 132 are transported to a curing station 507, at which the adhesive 154 is cured. The curing station 507 includes the above-described curing apparatus 170. As described above, the curing apparatus 170 is operated to cure the adhesive 154 to bond the first fabric portion 122 to the second fabric portion 132. In some embodiments, the curing apparatus 170 is controlled by the controller 50. As described above, in some embodiments, the curing station 507 may be omitted or may be present but unused.

Then the first and second frames 120, 130 with the combined first and second fabric portions 122, 132 are transported to station 508, which includes the cutter 146, described above. The cutter 146 cuts out a first component 22 of the fabric article 20 from the first fabric portion 122, and cuts out a second component 24 of the fabric article 20 from the second fabric portion 132. In some embodiments, the cutter 146 is controlled by the controller 50. The first and second components 22, 24 have been bonded together by the adhesive 154 applied previously at station 505.

As illustrated, in some embodiments, the first frame 120 and the second frame 130 are removed from the combined first and second components 22, 24 following the above cutting operation by the cutter 146. After cutting out the first and second components 22, 24, a residual piece 124 of the first fabric portion 122 remains in the first frame 120. The residual piece 124 of the first fabric portion 122 is removed from the first frame 120 to be discarded, recycled, or reused.

The first frame 120 can be reused. Similarly, a residual piece 134 of the second fabric portion 132 remains in the second frame 130. The residual piece 134 of the second fabric portion 132 is removed from the second frame 130 to be discarded, recycled, or reused. The second frame 130 can be reused.

In some embodiments, at least one of the first frame 120 or the second frame 130 is removed from the combined first and second fabric portions 122, 132 before the cutter 146 is operated to cut out the first component 22 from the first fabric portion 122, and cut out the second component 24 from the second fabric portion 132.

The bonded first and second components 22, 24 are transported to station 509. In some embodiments, one or more additional components 26 of the fabric article 20 are assembled onto the bonded first and second components 22, 24 at station 509. In some embodiments, the station 509 includes apparatus such as that described in U.S. patent application Ser. No. 17/711,347; filed on Apr. 1, 2022; referenced above. In some embodiments, the methods performed at the station 509 include one or more of the methods disclosed in U.S. patent application Ser. No. 17/711,347. In some embodiments, the assembly of the additional components 26 onto the bonded first and second components 22, 24 is controlled by the controller 50. At the station 509, the fabric article 20 formed by the assembled components 22, 24, and 26 (if present) is turned inside-out such that a right side of at least one of the first or second 22, 24 components faces outwards. As illustrated, in some embodiments, the fabric article 20 is manipulated such that the printed design 23 faces outwards. In some embodiments, the turning inside-out of the fabric article 20 is controlled by the controller 50. In some embodiments, other finishing operations, as described above, may be performed at station 509.

In some embodiments, the fabric article 20 is transported to a packaging station at which the fabric article 20 is packaged for further transport. In some embodiments, the packaging of the fabric article 20 is controlled by the controller 50.

FIGS. 6A and 6B schematically illustrate a system 600 for manufacturing a fabric article 20. System 600 includes the apparatus of system 100, but is configured to perform operations described above in a different sequence. In some embodiments, the system 600 includes the controller 50 for monitoring and controlling the operations of the system 600, such as described above for any of systems 100, 100A, 200, 300, 400, or 500. In such embodiments, the controller 50 may be configured to monitor and control the operations of any one or more of the elements of the system 600.

A single web of fabric 112 is unwound, such as from the roller 114. In some embodiments, the unwinding operation is controlled by the controller 50. The web of fabric 112 is unwound onto the work surface 110A at station 601—or, after unwinding, is transported to station 601—which includes the cutter 140, described above. The cutter 140 cuts the unwound web of fabric 112 into one or more first fabric portions 122 and one or more second fabric portions 132, as described above. In some embodiments, the cutter 140 also makes one or more intermediate cuts 148 (such as described above) in each first fabric portion 122 or in each second fabric portion 132. In some embodiments, the one or more intermediate cuts 148 may be omitted. In some embodiments, the cutting of the web of fabric 112 is controlled by the controller 50.

Each first fabric portion 122 is transported to station 602, at which each first fabric portion 122 is mounted to a corresponding first frame 120. In some embodiments, a cutter makes one or more intermediate cuts 148 (such as described above) in each first fabric portion 122 after each first fabric portion 122 is mounted to the corresponding first frame 120. In some embodiments, the cutter making the one or more intermediate cuts 148 in each first fabric portion 122 is controlled by the controller 50. In some embodiments, the one or more intermediate cuts 148 may be omitted.

Then the first frame 120 with the first fabric portion 122 is transported to station 603, which includes the printer 160, described above. The printer 160 prints a design 23 onto the first fabric portion 122. In some embodiments, the printing of the design 23 is controlled by the controller 50. In an example, a sensor associated with the printer 160 detects a feature of the first fabric portion 122, such as a fiducial on or in the first fabric portion 122. In another example, a sensor associated with the printer 160 detects a feature of the first frame 120, such as a characteristic shape or a fiducial (such as fiducial 946, FIG. 9A) of the first frame 120. For instance, the sensor may include one of a camera, a barcode reader, a QR code reader, an RFID tag reader, or a proximity sensor. The controller 50 uses information of the detected feature to direct the printer 160 to print the design 23 at a specific location on the first fabric portion 122. In some embodiments, such as in the manufacture of fabric articles 20 that do not include a printed design 23, the printing operation may be omitted.

Each second fabric portion 132 is transported to station 604, represented by work surface 1106, at which each second fabric portion 132 is mounted to a corresponding second frame 130. In some embodiments, a cutter makes one or more intermediate cuts 148 (such as described above) in each second fabric portion 132 after each second fabric portion 132 is mounted to the corresponding second frame 130. In some embodiments, the cutter making the one or more intermediate cuts 148 in each second fabric portion 132 is controlled by the controller 50. In some embodiments, the one or more intermediate cuts 148 may be omitted.

Then the second frame 130 with the second fabric portion 132 is transported to station 605, which includes an adhesive applicator 150, described above. The adhesive applicator 150 applies the adhesive 154 onto the second fabric portion 132, as described above. In some embodiments, the adhesive applicator 150 is controlled by the controller 50. Then the second frame 130 with the second fabric portion 132 is transported to station 606, at which the first fabric portion 122 is brought into contact with the second fabric portion 132 and the adhesive 154, as described above. As illustrated, in some embodiments, the side of first fabric portion 122 on which the design 23 has been printed is positioned to face the side of the second fabric portion 132 on which the adhesive 154 has been applied. In some embodiments, the positioning of the first fabric portion 122 with respect to the second fabric portion 132 is controlled by the controller 50.

Then, in some embodiments, the frames 120, 130 and respective fabric portions 122, 132 are transported to a curing station 607, at which the adhesive 154 is cured. The curing station 607 includes the above-described curing apparatus 170. As described above, the curing apparatus 170 is operated to cure the adhesive 154 to bond the first fabric portion 122 to the second fabric portion 132. In some embodiments, the curing apparatus 170 is controlled by the controller 50. As described above, in some embodiments, the curing station 607 may be omitted or may be present but unused.

Then the first and second frames 120, 130 with the combined first and second fabric portions 122, 132 are transported to station 608, which includes the cutter 146, described above. The cutter 146 cuts out a first component 22 of the fabric article 20 from the first fabric portion 122, and cuts out a second component 24 of the fabric article 20 from the second fabric portion 132. In some embodiments, the cutter 146 is controlled by the controller 50. The first and second components 22, 24 have been bonded together by the adhesive 154 applied previously at station 605.

As illustrated, in some embodiments, the first frame 120 and the second frame 130 are removed from the combined first and second components 22, 24 following the above cutting operation by the cutter 146. After cutting out the first and second components 22, 24, a residual piece 124 of the first fabric portion 122 remains in the first frame 120. The residual piece 124 of the first fabric portion 122 is removed from the first frame 120 to be discarded, recycled, or reused. The first frame 120 can be reused. Similarly, a residual piece 134 of the second fabric portion 132 remains in the second frame 130. The residual piece 134 of the second fabric portion 132 is removed from the second frame 130 to be discarded, recycled, or reused. The second frame 130 can be reused.

In some embodiments, at least one of the first frame 120 or the second frame 130 is removed from the combined first and second fabric portions 122, 132 before the cutter 146 is operated to cut out the first component 22 from the first fabric portion 122, and cut out the second component 24 from the second fabric portion 132.

The bonded first and second components 22, 24 are transported to station 609. In some embodiments, one or more additional components 26 of the fabric article 20 are assembled onto the bonded first and second components 22, 24 at station 609. In some embodiments, the station 609 includes apparatus such as that described in U.S. patent application Ser. No. 17/711,347; filed on Apr. 1, 2022; referenced above. In some embodiments, the methods performed at the station 609 include one or more of the methods disclosed in U.S. patent application Ser. No. 17/711,347. In some embodiments, the assembly of the additional components 26 onto the bonded first and second components 22, 24 is controlled by the controller 50. At the station 609, the fabric article 20 formed by the assembled components 22, 24, and 26 (if present) is turned inside-out such that a right side of at least one of the first or second 22, 24 components faces outwards. As illustrated, in some embodiments, the fabric article 20 is manipulated such that the printed design 23 faces outwards. In some embodiments, the turning inside-out of the fabric article 20 is controlled by the controller 50. In some embodiments, other finishing operations, as described above, may be performed at station 609.

In some embodiments, the fabric article 20 is transported to a packaging station at which the fabric article 20 is packaged for further transport. In some embodiments, the packaging of the fabric article 20 is controlled by the controller 50.

FIGS. 7A and 7B schematically illustrate a system 700 for manufacturing a fabric article 20. System 700 includes the apparatus of system 100, but is configured to perform operations described above in a different sequence. In some embodiments, the system 700 includes the controller 50 for monitoring and controlling the operations of the system 700, such as described above for any of systems 100, 100A, 200, 300, 400, 500 or 600. In such embodiments, the controller 50 may be configured to monitor and control the operations of any one or more of the elements of the system 700.

A web of a first fabric 112A is unwound, such as from the roller 114A. In some embodiments, the unwinding operation is controlled by the controller 50. The web of first fabric 112A is unwound onto the work surface 110A at station 701—or, after unwinding, is transported to station 701—which includes the printer 160, described above. The printer 160 prints a design 23 onto the web of first fabric 112A, as described above. In some embodiments, the printing of the design 23 is controlled by the controller 50. In some embodiments, such as in the manufacture of fabric articles 20 that do not include a printed design 23, the printing operation may be omitted.

Then the web of first fabric 112A is transported to station 702, which includes the cutter 140, described above. The cutter 140 cuts the web of first fabric 112A to create one or more first components 22 of the fabric article 20. As illustrated, in some embodiments, the cutter 140 cuts the web of first fabric 112A to create one or more additional components 26 of the fabric article 20.

The portion of the web of first fabric 112A that is not part of any component that is created by cutting with the cutter 140 is a web of remainder fabric 116. After cutting the components 22, 26, the web of remainder fabric 116 is removed from the work surface 110A while the components 22, 26 are maintained on the work surface 110A. In embodiments in which the work surface 110A is configured to hold the fabric, the components 22, 26 are maintained on the work surface 110A by the holding mechanism of the work surface 110A, such as by the electrostatic plate or vacuum assembly described above. In some embodiments, the web of remainder fabric 116 is removed from the work surface 110A by winding the web of remainder fabric 116 onto a roller 115. In some embodiments, the removal of the web of remainder fabric 116 from the work surface 110A is controlled by the controller 50.

The components 22, 26 are transported to station 705, at which the first component 22 of the fabric article 20 is to be picked up for assembly, as described below.

A web of a second fabric 112B is unwound, such as from a roller 114B. In some embodiments, the unwinding operation is controlled by the controller 50. The web of second fabric 112b is unwound onto the work surface 110b at station 703—or, after unwinding, is transported to station 703—which includes the cutter 144, described above. The cutter 144 cuts the unwound web of second fabric 112B into one or more fabric portions 182, as described above. In some embodiments, the cutter 144 also makes one or more intermediate cuts 148 (such as described above) in each second fabric portion 132. In some embodiments, the one or more intermediate cuts 148 may be omitted. In some embodiments, the cutting of the web of second fabric 112B is controlled by the controller 50.

Each fabric portion 182 is mounted to a corresponding frame 180. An example frame 180 is described below with respect to FIGS. 9A-9D. In some embodiments, a cutter makes one or more intermediate cuts 148 (such as described above) in each fabric portion 182 after each fabric portion 182 is mounted to the corresponding frame 180. In some embodiments, the cutter making the one or more intermediate cuts 148 in each fabric portion 182 is controlled by the controller 50. In some embodiments, the one or more intermediate cuts 148 may be omitted.

The frame 180 with the fabric portion 182 is transported to station 704, which includes an adhesive applicator 150, described above. The adhesive applicator 150 applies the adhesive 154 onto the fabric portion 182, as described above. In some embodiments, the adhesive applicator 150 is controlled by the controller 50. Then the frame 180 with the fabric portion 182 is transported to station 705.

At station 705, the first component 22 is brought into contact with the fabric portion 182 and the adhesive 154. Station 705 includes a robot 960 that is used to position the first component 22 onto the fabric portion 182. Station 705 includes an auxiliary robot 970 that is used to position the first component 222 onto the fabric portion 182. Examples of the robot 960 and the auxiliary robot 970 are described below with respect to FIGS. 11A-11J and FIGS. 12A-12G.

The robot 960 and the auxiliary robot 970 are used in combination to position the first component 22 onto the fabric portion 182. The robot 960 and the auxiliary robot 970 manipulate the first component 22 such that the side of first component 22 on which the design 23 has been printed is positioned to face the side of the fabric portion 182 on which the adhesive 154 has been applied. Exemplary details of the operation of the robot 960 and the auxiliary robot 970 are described below with respect to FIGS. 11A-11J and FIGS. 12A-12G. In some embodiments, operation of the robot 960 and the auxiliary robot 970 is controlled by the controller 50.

Then, in some embodiments, the frame 180 with the fabric portion 182 and first component 22 are transported to a curing station 706, at which the adhesive 154 is cured. The curing station 706 includes the above-described curing apparatus 170. As described above, the curing apparatus 170 is operated to cure the adhesive 154. The adhesive 154 bonds the fabric portion 182 to the first component 22. In some embodiments, the curing apparatus 170 is controlled by the controller 50. As described above, in some embodiments, the curing station 706 may be omitted or may be present but unused.

Then the frame 180 with the combined fabric portion 182 and first component 22 is transported to station 707, which includes the cutter 146, described above. The cutter 146 cuts out a second component 24 of the fabric article 20 from the fabric portion 182. In some embodiments, the cutter 146 also trims the first component 22 while cutting the fabric portion 182 to create the second component 24. In some embodiments, the cutter 146 is controlled by the controller 50. The first and second components 22, 24 have been bonded together by the adhesive 154 applied previously at station 704.

As illustrated, in some embodiments, the frame 180 is removed from the combined first and second components 22, 24 following the above cutting operation by the cutter 146. After cutting out the second component 24, a residual piece 184 of the fabric portion 182 remains in the frame 180. The residual piece 184 of the fabric portion 182 is removed from the frame 180 to be discarded, recycled, or reused. The frame 180 can be reused. In some embodiments, the frame 180 is removed from the fabric portion 182 before the cutter 146 is operated to cut out the second component 24 from the fabric portion 182.

The bonded first and second components 22, 24 are transported to station 708. In some embodiments, one or more additional components 26 of the fabric article 20 are assembled onto the bonded first and second components 22, 24 at station 708. In some embodiments, the station 708 includes apparatus such as that described in U.S. patent application Ser. No. 17/711,347; filed on Apr. 1, 2022; referenced above. In some embodiments, the methods performed at the station 708 include one or more of the methods disclosed in U.S. patent application Ser. No. 17/711,347. In some embodiments, the assembly of the additional components 26 onto the bonded first and second components 22, 24 is controlled by the controller 50. At the station 708, the fabric article 20 formed by the assembled components 22, 24, and 26 (if present) is turned inside-out such that a right side of at least one of the first or second 22, 24 components faces outwards. As illustrated, in some embodiments, the fabric article 20 is manipulated such that the printed design 23 faces outwards. In some embodiments, the turning inside-out of the fabric article 20 is controlled by the controller 50. In some embodiments, other finishing operations, as described above, may be performed at station 708.

In some embodiments, the fabric article 20 is transported to a packaging station at which the fabric article 20 is packaged for further transport. In some embodiments, the packaging of the fabric article 20 is controlled by the controller 50.

Figure 8A:
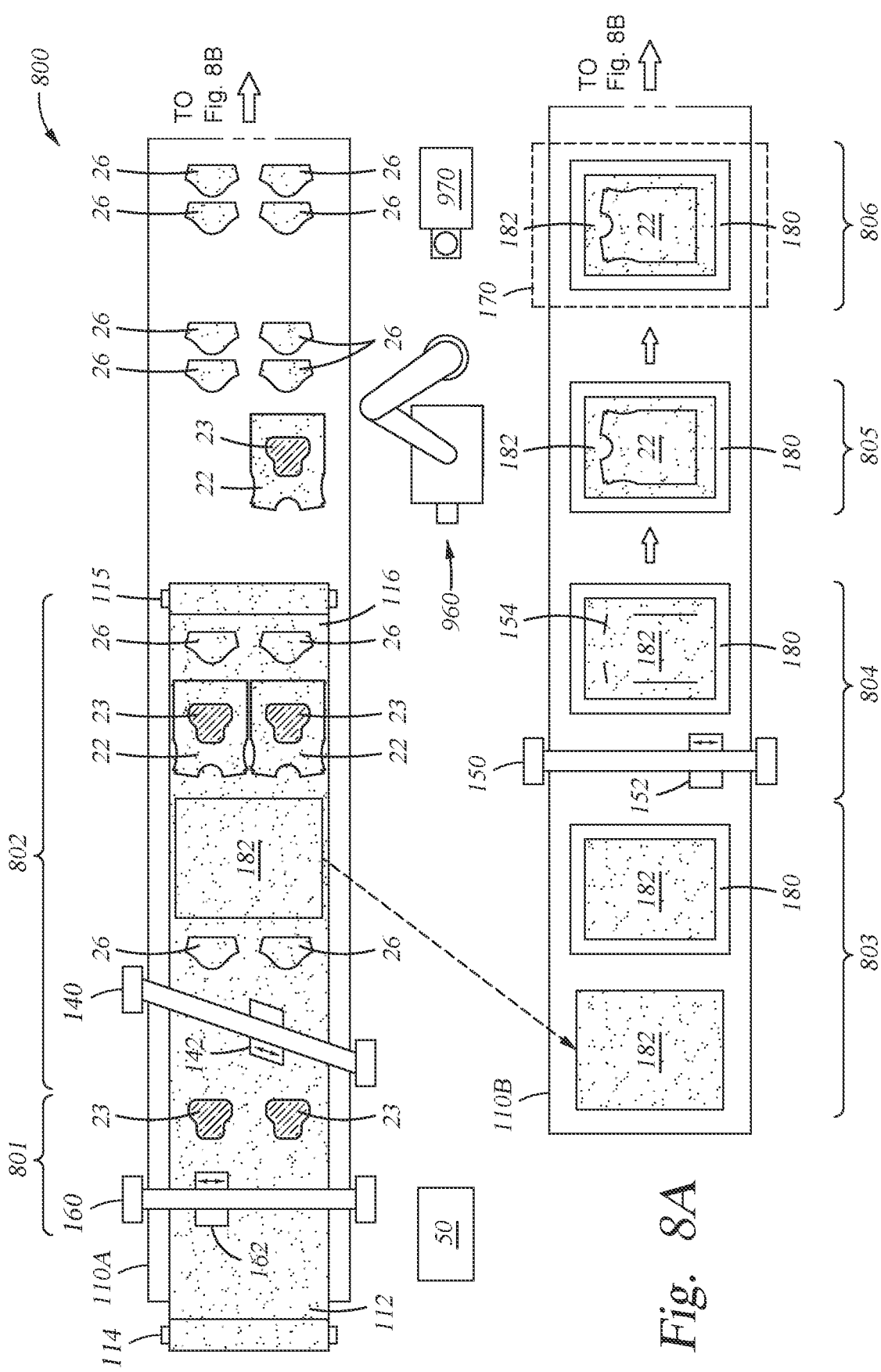

FIGS. 8A and 8B schematically illustrate a system 800 for manufacturing a fabric article 20. System 800 includes the apparatus of system 100, but is configured to perform operations described above in a different sequence. In some embodiments, the system 800 includes the controller 50 for monitoring and controlling the operations of the system 800, such as described above for any of systems 100, 100A, 200, 300, 400, 500, 600 or 700. In such embodiments, the controller 50 may be configured to monitor and control the operations of any one or more of the elements of the system 800.

A single web of fabric 112 is unwound, such as from the roller 114. In some embodiments, the unwinding operation is controlled by the controller 50. The web of fabric 112 is unwound onto the work surface 110A at station 801—or, after unwinding, is transported to station 801—which includes the printer 160, described above. The printer 160 prints a design 23 onto the web of fabric 112, as described above. In some embodiments, the printing of the design 23 is controlled by the controller 50. In some embodiments, such as in the manufacture of fabric articles 20 that do not include a printed design 23, the printing operation may be omitted.

Then the web of fabric 112 is transported to station 802, which includes the cutter 140, described above. The cutter 140 cuts the web of fabric 112 into one or more fabric portions 182, as described above. In some embodiments, the cutter 140 also makes one or more intermediate cuts 148 (such as described above) in each fabric portion 182. In some embodiments, the one or more intermediate cuts 148 may be omitted. The cutter 140 also cuts the web of fabric 112 to create one or more first components 22 of the fabric article 20. As illustrated, in some embodiments, the cutter 140 cuts the web of fabric 112 to create one or more additional components 26 of the fabric article 20.

The portion of the web of fabric 112 that is not part of any component that is created by cutting with the cutter 140 is a web of remainder fabric 116. After cutting the components 22, 26, the web of remainder fabric 116 is removed from the work surface 110A while the components 22, 26 are maintained on the work surface 110A. In embodiments in which the work surface 110A is configured to hold the fabric, the components 22, 26 are maintained on the work surface 110A by the holding mechanism of the work surface 110A, such as by the electrostatic plate or vacuum assembly described above. In some embodiments, the web of remainder fabric 116 is removed from the work surface 110A by winding the web of remainder fabric 116 onto a roller 115. In some embodiments, the removal of the web of remainder fabric 116 from the work surface 110A is controlled by the controller 50.

The components 22, 26 are transported to station 805, at which the first component 22 of the fabric article 20 is to be picked up for assembly, as described below.

The fabric portions 182 are transported to station 803, represented by work surface 1106, at which each fabric portion 182 is mounted to a corresponding frame 180. In some embodiments, a cutter makes one or more intermediate cuts 148 (such as described above) in each fabric portion 182 after each fabric portion 182 is mounted to the corresponding frame 180. In some embodiments, the cutter making the one or more intermediate cuts 148 in each fabric portion 182 is controlled by the controller 50. In some embodiments, the one or more intermediate cuts 148 may be omitted.

The frame 180 with the fabric portion 182 is transported to station 804, which includes an adhesive applicator 150, described above. The adhesive applicator 150 applies the adhesive 154 onto the fabric portion 182, as described above. In some embodiments, the adhesive applicator 150 is controlled by the controller 50. Then the frame 180 with the fabric portion 182 is transported to station 805.

At station 805, the first component 22 is brought into contact with the fabric portion 182 and the adhesive 154. Station 805 includes a robot 960 that is used to position the first component 22 onto the fabric portion 182. Station 805 includes an auxiliary robot 970 that is used to position the first component 222 onto the fabric portion 182. Examples of the robot 960 and the auxiliary robot 970 are described below with respect to FIGS. 11A-11J and FIGS. 12A-12G.

The robot 960 and the auxiliary robot 970 are used in combination to position the first component 22 onto the fabric portion 182. The robot 960 and the auxiliary robot 970 manipulate the first component 22 such that the side of first component 22 on which the design 23 has been printed is positioned to face the side of the fabric portion 182 on which the adhesive 154 has been applied. Exemplary details of the operation of the robot 960 and the auxiliary robot 970 are described below with respect to FIGS. 11A-11J and FIGS. 12A-12G. In some embodiments, operation of the robot 960 and the auxiliary robot 970 is controlled by the controller 50.

Then, in some embodiments, the frame 180 with the fabric portion 182 and first component 22 are transported to a curing station 806, at which the adhesive 154 is cured. The curing station 806 includes the above-described curing apparatus 170. As described above, the curing apparatus 170 is operated to cure the adhesive 154. The adhesive 154 bonds the fabric portion 182 to the first component 22. In some embodiments, the curing apparatus 170 is controlled by the controller 50. As described above, in some embodiments, the curing station 806 may be omitted or may be present but unused.

Then the frame 180 with the combined fabric portion 182 and first component 22 is transported to station 807, which includes the cutter 146, described above. The cutter 146 cuts out a second component 24 of the fabric article 20 from the fabric portion 182. In some embodiments, the cutter 146 also trims the first component 22 while cutting the fabric portion 182 to create the second component 24. In some embodiments, the cutter 146 is controlled by the controller 50. The first and second components 22, 24 have been bonded together by the adhesive 154 applied previously at station 804.

As illustrated, in some embodiments, the frame 180 is removed from the combined first and second components 22, 24 following the above cutting operation by the cutter 146. After cutting out the second component 24, a residual piece 184 of the fabric portion 182 remains in the frame 180. The residual piece 184 of the fabric portion 182 is removed from the frame 180 to be discarded, recycled, or reused. The frame 180 can be reused. In some embodiments, the frame 180 is removed from the fabric portion 182 before the cutter 146 is operated to cut out the second component 24 from the fabric portion 182.

The bonded first and second components 22, 24 are transported to station 808. In some embodiments, one or more additional components 26 of the fabric article 20 are assembled onto the bonded first and second components 22, 24 at station 808. In some embodiments, the station 808 includes apparatus such as that described in U.S. patent application Ser. No. 17/711,347; filed on Apr. 1, 2022; referenced above. In some embodiments, the methods performed at the station 808 include one or more of the methods disclosed in U.S. patent application Ser. No. 17/711,347. In some embodiments, the assembly of the additional components 26 onto the bonded first and second components 22, 24 is controlled by the controller 50. At the station 808, the fabric article 20 formed by the assembled components 22, 24, and 26 (if present) is turned inside-out such that a right side of at least one of the first or second 22, 24 components faces outwards. As illustrated, in some embodiments, the fabric article 20 is manipulated such that the printed design 23 faces outwards. In some embodiments, the turning inside-out of the fabric article 20 is controlled by the controller 50. In some embodiments, other finishing operations, as described above, may be performed at station 808.

In some embodiments, the fabric article 20 is transported to a packaging station at which the fabric article 20 is packaged for further transport. In some embodiments, the packaging of the fabric article 20 is controlled by the controller 50.

Figure 9A:
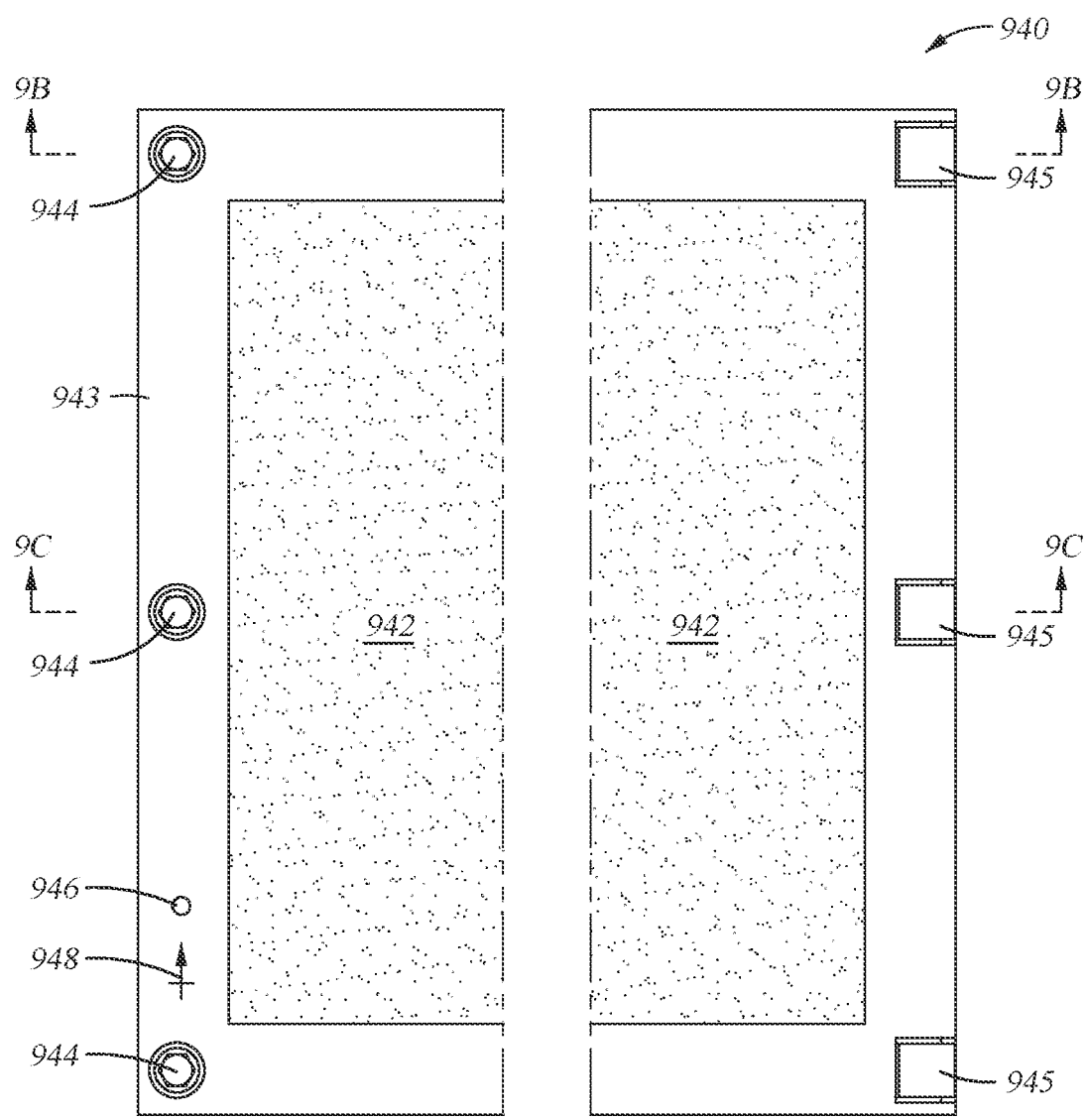
FIGS. 9A-9D schematically illustrate an exemplary frame for use in any of the systems of the present disclosure.
Figure 9B:
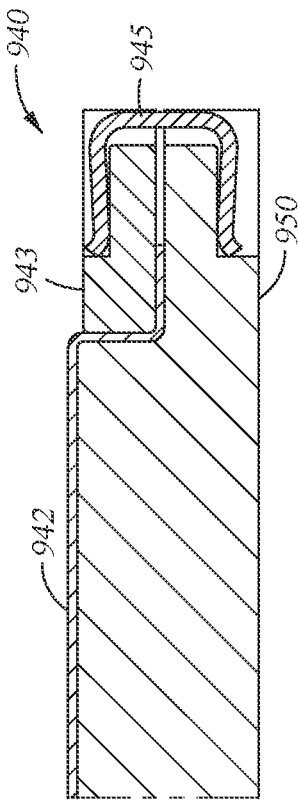
Figure 9C:
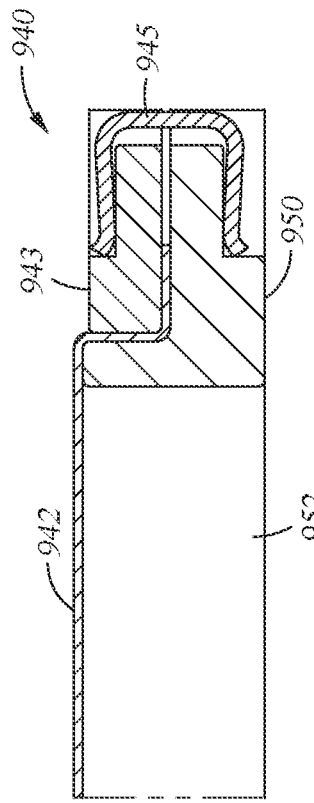
Figure 9D:
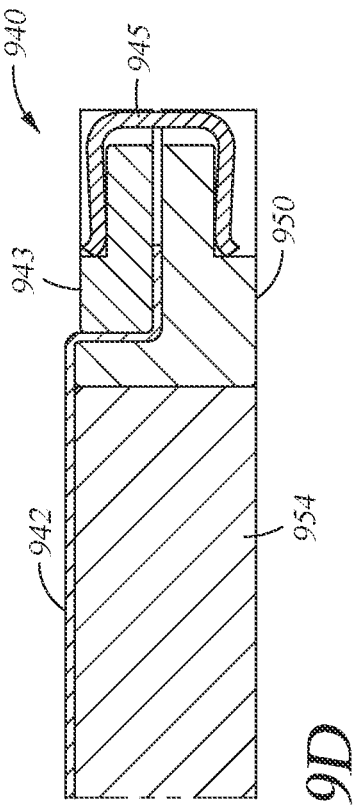

FIGS. 9A-9D schematically illustrate an exemplary frame 940 for use in any of the systems 100, 100A, 200, 300, 400, 500, 600, 700, or 800. FIG. 9A is a plan view, and FIGS. 9B-9D are cross-sectional views of the frame 940. The frame 940 represents any of the first frame 120, second frame 130, or the frame 180. The frame 940 is depicted with a fabric portion 942 mounted thereto. The fabric portion 942 represents any of the first fabric portion 122, second fabric portion 132, or fabric portion 182. In some embodiments, the fabric portion 942 is a discrete fabric portion. In some embodiments, the fabric portion 942 is part of a web of fabric.

The frame 940 includes a base 950, upon which the fabric portion 942 is mounted. In some embodiments, the base 950 is made of a material such as wood, metal, plastic, or a composite material. As shown by the cross-sections in FIGS. 9B and 9C, in some embodiments, the base 950 is annular and surrounds a void space 952. In such embodiments, the void space facilitates access to the side of the fabric portion 942 that faces the base 950. In some embodiments, the base 950 is not annular, such that the void space 952 is omitted, and access to the side of the fabric portion 942 that faces the base 950 may be limited.

Additionally, in some embodiments, an insert 954 (shown in FIG. 9D) may be placed in the void space 952 in order to support the fabric portion 942 while an operation is being performed on the side of the fabric portion 942 that faces away from the base 950. In some embodiments, the insert 954 contacts the fabric portion 942 with a flat surface parallel to the plane of the fabric portion 942. In some embodiments, the insert 954 contacts the fabric portion 942 with a flat surface that is not parallel to the plane of the fabric portion 942. In some embodiments, the insert 954 contacts the fabric portion 942 with a contoured surface that is not flat.

In some embodiments, the fabric portion 942 is mounted on the base 950 such that the fabric portion 942 is stretched. In some of such embodiments, the fabric portion 942 is mounted on the base 950 such that the fabric portion 942 is taut. In some embodiments, the fabric portion 942 is mounted on the base 950 such that the fabric portion 942 is not stretched.

In some embodiments, the fabric portion 942 is held on the base 950 by an adhesive. In some embodiments, the fabric portion 942 is held on the base 950 by tape. As illustrated, in some embodiments, the fabric portion 942 is held on the base 950 by a faceplate 943. The faceplate 943 is shaped (such as in an annular configuration) such that an outer section of the fabric portion 942 is sandwiched between the faceplate 943 and the base 950, whereas an inner section of the fabric portion 942 is not covered by the faceplate 943. The faceplate 943 is coupled to the base 950 by one or more fasteners. In an example, the coupling of the faceplate 943 to the base 950 includes a hinge. In some embodiments, the one or more fasteners include one or more hook-and-loop fastening patches. In some embodiments, the one or more fasteners include a wire. As illustrated, an example fastener includes a screw 944 that couples the faceplate 943 to the base 950. Also illustrated, another example fastener includes a clip 945 that couples the faceplate 943 to the base 950. Other example fasteners include latches, bolts, nuts, nails, pins, staples, rivets, and the like. Other example fasteners include flaps, such as swiveling (for example: hinged) flaps that may be secured in place by latches, screws, bolts, nuts, nails, pins, staples, rivets, and the like. In some embodiments, the faceplate 943 may be omitted, and the fabric portion 942 is held on the base 950 by the one or more fasteners described above.

In some embodiments, the fasteners used to hold the faceplate 943 and the fabric portion 942 onto the base 950 may be located at one side of the frame 940. In some embodiments, the fasteners used to hold the faceplate 943 and the fabric portion 942 onto the base 950 may be located at more than one side of the frame 940. In some embodiments, the fasteners used to hold the faceplate 943 and the fabric portion 942 onto the base 950 may be located at each side of the frame 940 around the fabric portion 942. As illustrated, in some embodiments, the fasteners used to hold the faceplate 943 and the fabric portion 942 onto the base 950, such as the screws 944 or clips 945, may be recessed with respect to a surface of the faceplate 943.

As illustrated in FIGS. 9B-9D, in some embodiments, the faceplate 943 may be recessed with respect to a surface of the base 950. In at least some of such embodiments, the faceplate 943 is recessed with respect to an upward-facing surface of the fabric portion 942. In other examples, an upward-facing surface of the faceplate 943 is co-planar with an upward-facing surface of the fabric portion 942. In yet other examples, an upward-facing surface of the fabric portion 942 is recessed with respect to an upward-facing surface of the faceplate 943.

As illustrated in FIG. 9A, in some embodiments, the frame 940 may include a fiducial 946. As illustrated in FIG. 9A, in some embodiments, the fiducial 946 may include a datum 948. In some embodiments, a characteristic or distinguishing feature of the frame 940 may serve as the datum 948. In some embodiments, the datum 948 may provide a reference point, such as the origin of a coordinate system, for guiding tools performing operations on the fabric portion 942. In some embodiments, the fiducial 946 is positioned so as not to be obscured by the fabric portion 942 when the fabric portion 942 is mounted to the frame 940. As illustrated, in some embodiments, the fiducial 946 may be located on an upward-facing surface of the faceplate 943. In some embodiments, the fiducial 946 is positioned on an edge of the frame 940. In some embodiments, the fiducial 946 is positioned on a downward-facing side of the base 950 opposite to the side of the base 950 on which the fabric portion 942 is mounted.

In some embodiments, the fiducial 946 includes a symbol (such as a geometric shape) or a collections of symbols printed on, embossed in, or formed on a surface of the frame 940. In some embodiments, the fiducial 946 includes a readable code, such as a barcode or a QR code. In some embodiments, the fiducial 946 includes a readable tag, such as an RFID tag.

Figure 9E:
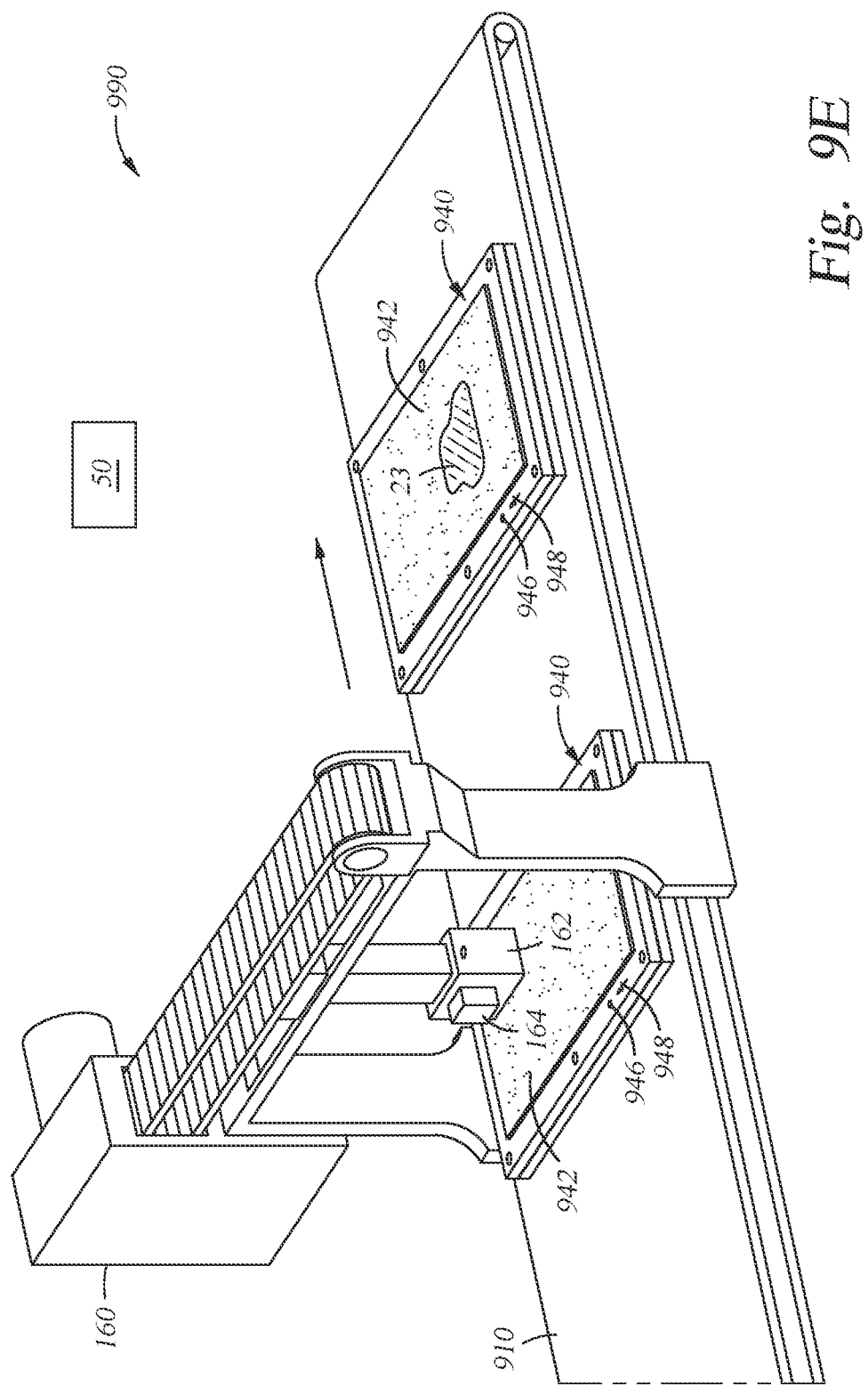
FIG. 9E schematically illustrates an exemplary operation involving the frame of FIGS. 9A-9D.

FIG. 9E schematically illustrates an example operation involving the fiducial 946. FIG. 9E schematically depicts a station 990 at which an operation is performed. The station 990 represents any station of any system of the present disclosure at which an operation is performed involving a fabric portion mounted to a frame. The operation may include any one or more of manipulating the frame (such as by a robot), cutting the fabric portion, applying adhesive to the fabric portion, curing adhesive applied to the fabric portion, or printing a design onto the fabric portion. The station may include apparatus, such as a robot, the cutter 146, the adhesive applicator 150, the printer 160, or the curing apparatus 170 configured to perform the operation on the fabric portion.

In the example depicted in FIG. 9E, the station 990 includes the printer 160, described above. The printer includes a sensor 164 configured to detect and or read a fiducial 946 of a frame 940. In any of the systems 100, 100A, 200, 300, 400, 500, 600, 700, or 800, any item of equipment, such as a robot, the cutter 146, the adhesive applicator 150, the printer 160, or the curing apparatus 170 may include a sensor configured to detect and or read a fiducial 946 of a frame 940. For instance, the sensor may include one of a camera, a barcode reader, a QR code reader, an RFID tag reader, or a proximity sensor. The frame 940 with a fabric portion 942 mounted thereto is on the work surface 910. In the illustrated example, the work surface 910 is part of a conveyor. However, in some embodiments, the work surface 910 may be part of a structure such as a table.

The sensor detects the fiducial 946 of the frame 940. As described above, in some embodiments, the fiducial may include a datum 948. The controller 50 uses information of the fiducial 946 to direct the item of equipment to perform an operation on the fabric portion 942 at a specific location of the fabric portion 942. For example, the controller 50 may correlate information associated with the fiducial 946 to a set of commands pertaining to an operation to be performed on the fabric portion 942. In the illustrated example, the controller 50 uses the information from the detected fiducial 946 to process instructions for the printer 160. For instance, the controller 50 may access a database of preloaded instructions, and process instructions for the printer 160 that correspond to the detected fiducial 946. In another example, the fiducial may be encoded with instructions pertaining to the operation to be performed at the station 990. For instance, in embodiments in which the fiducial 946 includes a barcode, a QR code, or an RFID tag, the sensor 164 may read from the fiducial 946 instructions concerning the operation to be performed at the station 990, and the instructions are processed by the controller 50. For example, the information contained in an RFID tag may include an identifier and instructions to print a certain color at particular coordinates relative to the datum 948.

At any station represented by station 990, the controller 50 processes the instructions, and directs the apparatus at the station to perform an operation on the fabric portion 942 while the fabric portion 942 remains mounted to the frame 940. In some embodiments, the controller 50 directs the apparatus to perform the operation at a defined part of the fabric portion 942 relative to the datum 948. In the illustrated example, the controller 50 directs the printer 160 to print a design 23 onto a specific region of the fabric portion 942.

In some embodiments, the controller 50 updates a database upon detection of the fiducial 946. In an example, the fiducial 946 includes an identifier, and the controller 50 updates a database to indicate that a specific item associated with the identifier is located at the station 990. In some embodiments, the controller 50 updates a database upon completion of an executed command. In an example, the fiducial 946 includes an identifier, and the controller 50 updates a database to indicate that a particular operation, such as printing the design 23 onto the fabric portion 942, has been completed for the specific item associated with the identifier.

In some embodiments, such as where the fiducial 946 includes a read-write medium, the controller 50 directs a transmitter to transmit information to be stored in a memory of the fiducial 946. In an example, the sensor associated with apparatus at a station, such as the sensor 164, may include a transceiver. For instance, the fiducial 946 may include an RFID tag, and the controller 50 may direct a transmitter (such as the sensor 164 if the sensor 164 includes a transceiver) to transmit information to the RFID tag. The information may include a record, such as a log, of the operation performed on the fabric portion 942 at the station 990. The information may include instructions for an operation to be performed on the fabric portion 942 at a subsequent station.

FIGS. 10A and 10B schematically illustrate exemplary configurations of frames for the joining of two fabric portions, each fabric portion mounted to a corresponding frame. The depicted configurations pertain to the joining of the first fabric portion 122 and the second fabric portion 132 in any of the systems 100, 100A, 200, 300, 400, 500, or 600. The frame 940A represents any one of the first frame 120 or the second frame 130, and may be configured similarly to the frame 940 of FIGS. 9A-9E. The frame 940B represents any other of the first frame 120 or the second frame 130, and may be configured similarly to the frame 940 of FIGS. 9A-9E. The fabric portions 942A and 942B represent the first or second fabric portions 122, 132 corresponding to each frame 940A, 940B. The fabric portion 942A is mounted to the frame 940A by being held on the base 950A by the faceplate 943A, and the fabric portion 942B is mounted to the frame 940B by being held on the base 950B by the faceplate 943B, as described above with respect to FIGS. 9A-9D.

FIG. 10A is an exploded cross-sectional view of one configuration. The frame 940A is oriented such that the fabric portion 942A affixed to the frame 940A is facing downwards. The frame 940B is oriented such that the fabric portion 942B affixed to the frame 940B is facing upwards. The fabric portion 942B is shown with adhesive 154 on the upward-facing surface. In some embodiments, the adhesive may instead be deposited on the fabric portion 942A. In the illustrated embodiment, when the frame 940A and the frame 940B are brought together, the fabric portion 942A contacts the fabric portion 942B and the adhesive 154. In some embodiments, the insert 954B may be placed in the void space 952B of the frame 940B in order to support the fabric portion 942B. In some embodiments, the insert 954A may be placed in the void space 952A of the frame 940A in order to contact the fabric portion 942A. In some embodiments, the use of the insert 954A and/or the insert 954B against the corresponding fabric portions 942A, 942B may enhance the distribution of the adhesive between and within the fabric portions 942A, 942B.

FIG. 10B is a cross-sectional view of another configuration. The frame 940A is oriented such that the fabric portion 942A affixed to the frame 940A is facing downwards. The frame 940B is oriented such that the fabric portion 942B affixed to the frame 940B is facing upwards. The frame 940A and the frame 940B have been brought together such that the fabric portion 942A contacts the fabric portion 942B and the adhesive (not shown).

The frames 940A and 940B are located on a work surface 910, which represents any work surface 110, 110A, 110B of any system of the present disclosure. The frames 940A and 940B are located between guides 956. In some embodiments, the guides 956 facilitate precise positioning of the frame 940A onto the frame 940B. In some embodiments, the guides 956 facilitate precise positioning of the fabric portion 942A onto the fabric portion 942B. In some embodiments, one or more of the guides 956 is movable along the work surface 910 in order to adjust the relative positioning of the frames 940A, 940B to each other. In some embodiments, one or more of the guides 956 is movable along the work surface 910 in order to secure the lateral and/or longitudinal positioning of at least one of the frame 940A or the frame 940B.

The insert 954B is placed in the void space 952B of the frame 940B in order to support the fabric portion 942B. A pressure plate 958 is placed in the void space 952A of the frame 940A, and contacts the fabric portion 942A. In some embodiments, a force is applied via the pressure plate 958 against the insert 954B through the fabric portions 942A, 942B to enhance the distribution of the adhesive between and within the fabric portions 942A, 942B.

In some embodiments at least one of the insert 954A, the insert 954B, and/or the pressure plate 958 may be heated, such as by steam or by an included heating element. In such embodiments, the configurations of FIGS. 10A and/or 10B may be used in the curing of the adhesive in any of the systems 100, 100A, 200, 300, 400, 500, 600, 700, or 800. In an example, the curing apparatus 170 includes at least one of the pressure plate 958 or the insert 954B. In some of such embodiments, the configurations of FIGS. 10A and/or 10B may be used in both the joining of fabric items and the curing of the adhesive in any of the systems 100, 100A, 200, 300, 400, 500, 600, 700, or 800. In an example, the station at which the joining is performed (such as station 104, 205, 305, 405, 506, 606, 705, or 805) can be the same station at which the adhesive is cured (such as station 105, 206, 306, 406, 507, 607, 706, or 806).

In some embodiments of the configurations depicted in FIGS. 10A and 10B, a robot may be used to position at least one of the frames 940A or 940B relative to the other frame 940A or 940B. The robot may be controlled by the controller 50. In an example, a sensor associated with the robot detects a feature of the fabric portion 942A or 942B, or detects a fiducial on or in the fabric portion 942A or 942B. In another example, a sensor associated with the robot detects a feature of the frame 940A or 940B, such as a characteristic shape or a fiducial (such as fiducial 946, FIG. 9A) of the frame 940A or 940B. For instance, the sensor may include one of a camera, a barcode reader, a QR code reader, an RFID tag reader, or a proximity sensor. The controller 50 uses information of the detected feature to direct the robot to position the frame 940A relative to the frame 940B, or to position the frame 940B relative to the frame 940A.

FIGS. 11A-11J and 12A-12G schematically illustrate exemplary operations of the robot 960 and the auxiliary robot 970. In some embodiments, operations of the robot 960 and the auxiliary robot 970 of FIGS. 11A-11J and 12A-12G are monitored and controlled by the controller 50.

In FIGS. 11A-11J and 12A-12G, work surface 910 represents any work surface 110, 110A, 110B of any system of the present disclosure. Item 920 represents any first component 22 or other component, such as additional component 26, of a fabric article 20 of the present disclosure. Item 930 represents any fabric portion 182, second component 24, or other component, such as additional component 226, of a fabric article 20 of the present disclosure. In some embodiments, item 930 is mounted in a frame, such as frame 940, as described above.

In some embodiments, the robot 960 may be mounted on a gantry above the work surface 910. In some embodiments, the robot 960 may be freestanding. In some embodiments, the robot 960 includes an articulated arm 962 attached to a head 964 that selectively holds and releases the item 920. In some embodiments, the head 964 includes clamps or other grippers that selectively hold or release the item 920. In some embodiments, the head 964 includes an electrostatic plate to selectively hold or release the item 920. In some embodiments, the head 964 includes a vacuum assembly, such as a perforated plate coupled to a vacuum pump, to selectively hold or release the item 920.

In some embodiments, the robot 960 includes a sensor 966 that is used to assist with positioning of the head 964 with respect to the item 920 and the item 930. In an example, the sensor 966 includes a camera. For instance, the camera may capture an image of the item 920, and relay the image to the controller 50. The controller 50 may determine the position, orientation, and/or extent of the item 920 on the work surface 910. The controller 50 may direct the head 964 to the item 920 according to the determined position, orientation, and/or extent of the item 920 on the work surface 910.

Figure 11A:
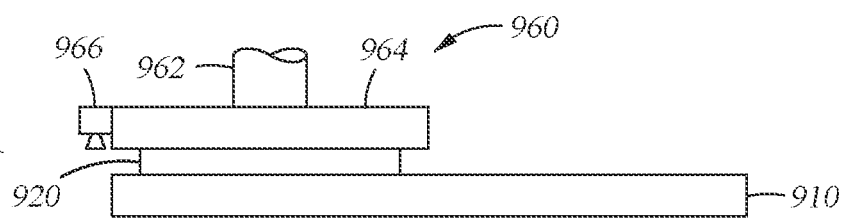
FIGS. 11A-11J schematically illustrate an exemplary operational sequence of a robot and an auxiliary robot of one or more system of the present disclosure.
Figure 11B:
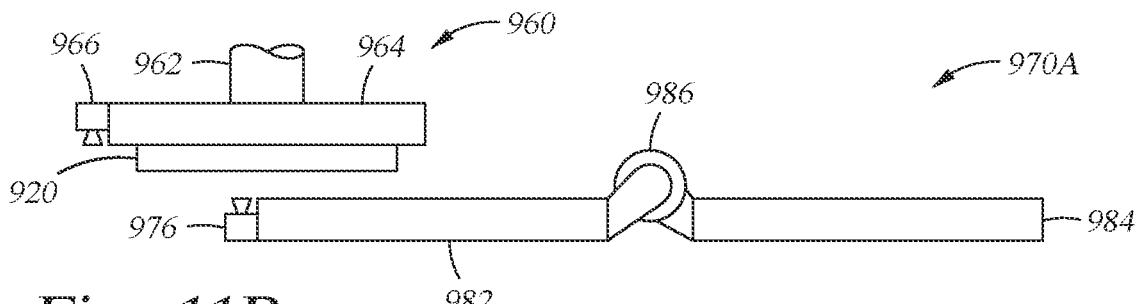
Figure 11C:
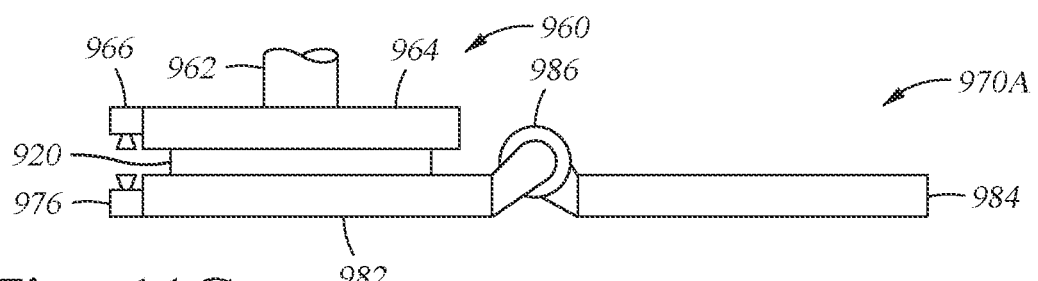

FIG. 11A shows the head 964 of the robot 960 being attached to the item 920. In some embodiments, the sensor 966 may be used to determine the position, orientation, and/or extent of the item 920 on the work surface 910 before the head 964 is attached to the item 920. FIG. 11B shows the robot 960 carrying the item 920 to the auxiliary robot 970. In the depicted embodiment, the auxiliary robot 970 is represented by auxiliary robot 970A. In this example, the auxiliary robot 970A is represented as first and second platens 982, 984 that are joined by a hinge 986. As illustrated, in some embodiments, the auxiliary robot 970A includes a second sensor 976. In an example, the second sensor 976 includes a camera. As shown in the Figure, in some embodiments, the second sensor 976 may be used to determine the position, orientation, and/or extent of the item 920 on the head 964 of the robot 960. Such information may be used to direct the head 964 of the robot 960 when the head 964 positions the item 920 onto the first platen 982. FIG. 11C shows the head 964 of the robot 960 positioning the item 920 onto the first platen 982. Then the head 964 of the robot 960 disengages from the item 920.

Figure 11D:
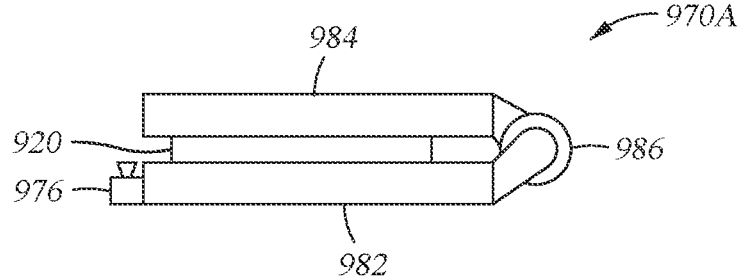

FIG. 11D shows the second platen 984 engaging with the item 920. As illustrated, in some embodiments, the second platen 984 pivots about the hinge 986 to engage the item 920. In some embodiments, the first platen 982 pivots about the hinge 986 to bring the item 920 into engagement with the second platen 984. In some embodiments, the first platen 982 and/or the second platen 984 may include an electrostatic plate to selectively hold or release the item 920. In some embodiments, the first platen 982 and/or the second platen 984 may include a vacuum assembly, such as a perforated plate coupled to a vacuum pump, to selectively hold or release the item 920.

Figure 11E:
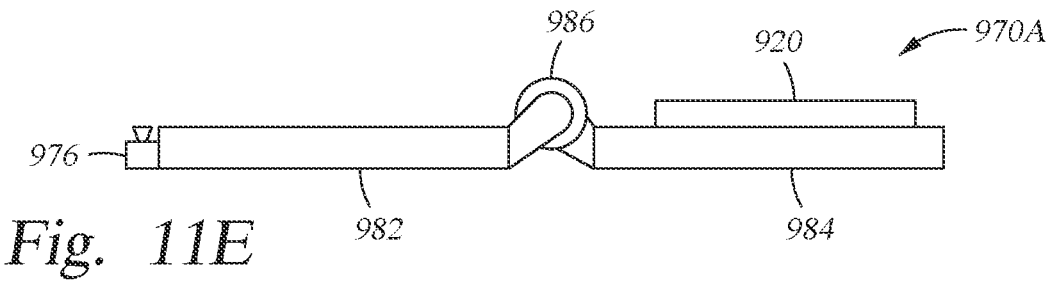
Figure 11F:
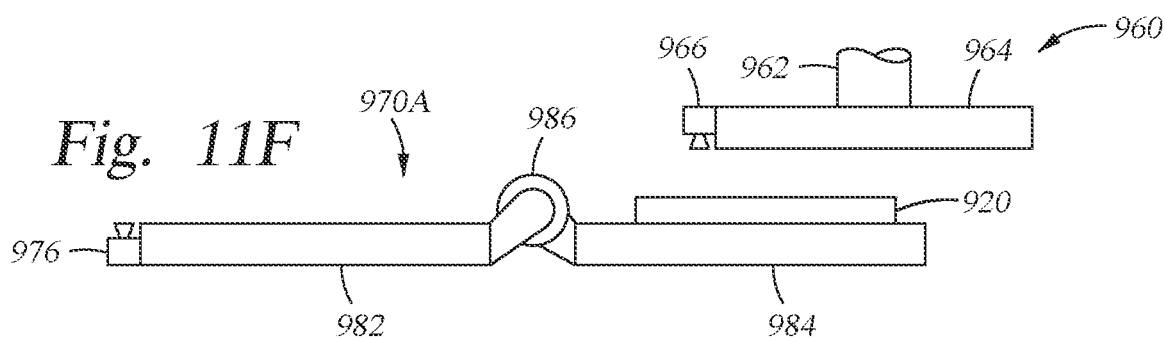
Figure 11G:
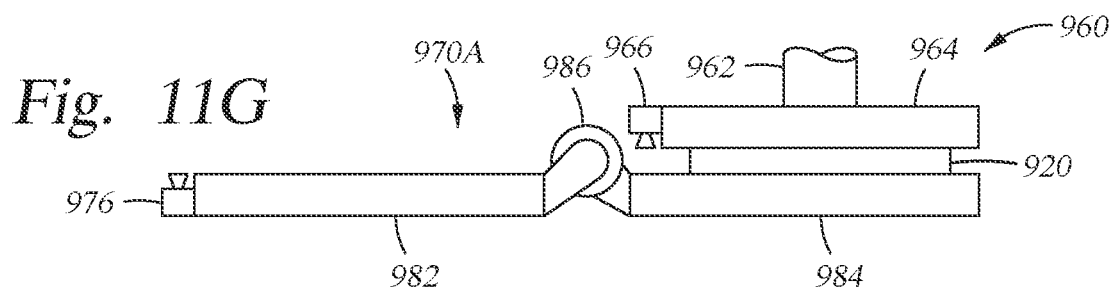

FIG. 11E shows the first platen 982 disengaged from the item 920. The item 920 is engaged with the second platen 984. FIG. 11F shows the head 964 of the robot 960 approaching the auxiliary robot 970A in order to pick up the item 920. As illustrated, in some embodiments, the sensor 966 may be used to determine the position, orientation, and/or extent of the item 920 on the second platen 984 before the head 964 is attached to the item 920. FIG. 11G shows the head 964 of the robot 960 being attached to the item 920. Then the robot 960 lifts the item 920 off the second platen 984.

Figure 11H:
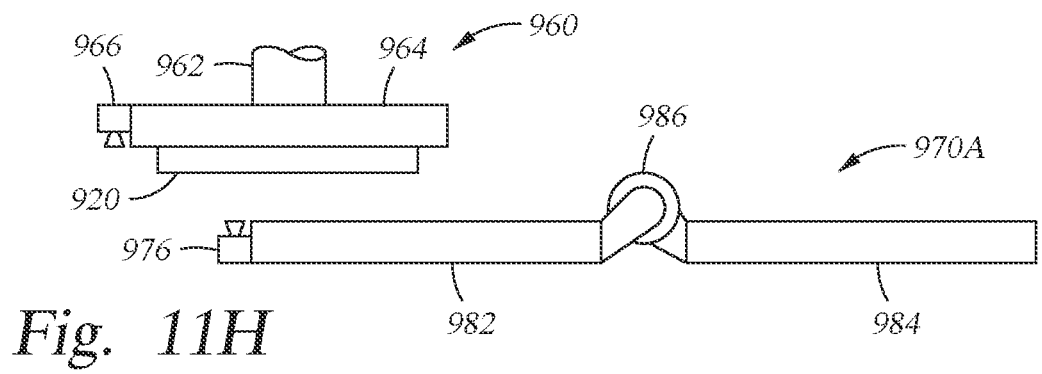
Figure 11I:
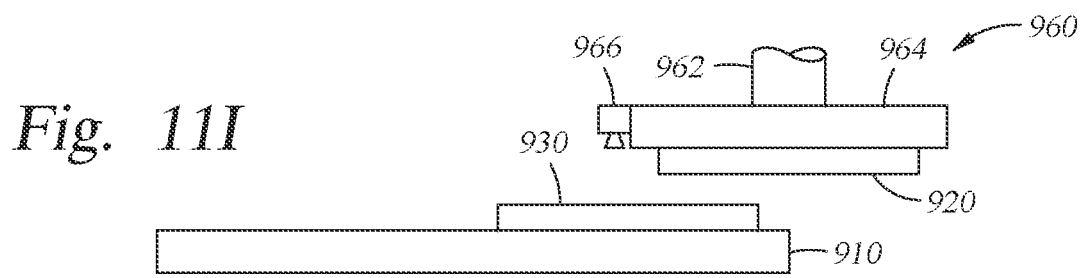

FIG. 11H shows the second sensor 976 being used to determine the position, orientation, and/or extent of the item 920 on the head 964 of the robot 960. Such information may be used to direct the head 964 of the robot 960 when the head 964 positions the item 920 onto the item 930 on the work surface 910. FIG. 11I shows the sensor 966 of the robot 960 being used to determine the position, orientation, and/or extent of the item 930 on the work surface 910 before the robot 960 positions the item 920 onto the item 930. In embodiments in which item 930 is mounted to a frame, the sensor 966 may be used to determine the position, orientation, and/or extent of the frame. Additionally, or alternatively, the sensor 966 may be used to identify a fiducial on the frame, such as fiducial 946, described above.

Figure 11J:
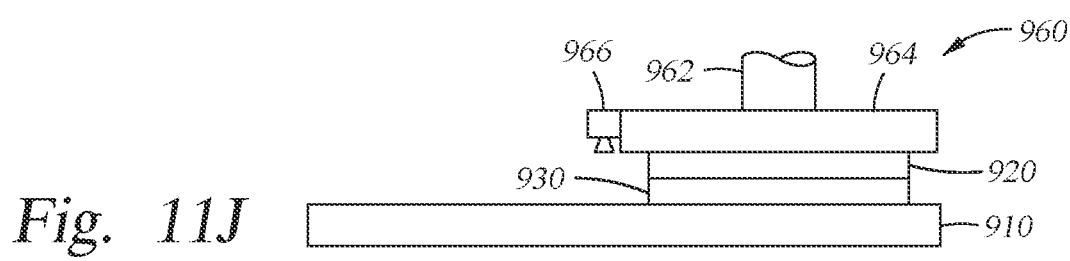

FIG. 11J shows the robot 960 positioning the item 920 onto the item 930 on the work surface 910. In some embodiments, the robot 960 may be operated such that the head 964 imparts a load onto the item 920 in order to press the item 920 against the item 930, and promote distribution of the adhesive 154 between and/or within the item 920 and the item 930. In some embodiments, the head 964 of the robot 960 includes a heater. In such embodiments, the heater may be actuated while the head 964 presses the item 920 against the item 930 in order to cure the adhesive 154, and bond the item 920 to the item 930. In some embodiments, the heater may be omitted or present but unused. Upon completion of the positioning and any curing operation by the robot 960, the head 964 of the robot 960 disengages from the item 920.

Figure 12A:
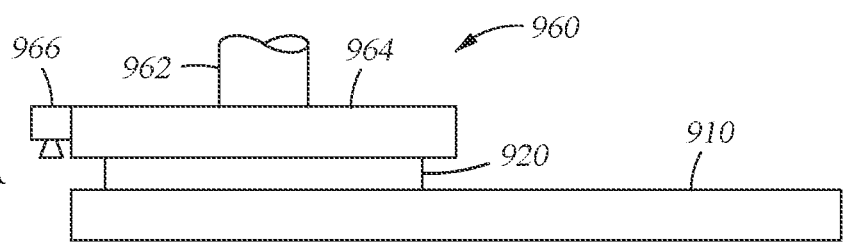
FIGS. 12A-12G schematically illustrate an exemplary operational sequence of a robot and an auxiliary robot of one or more system of the present disclosure.
Figure 12B:
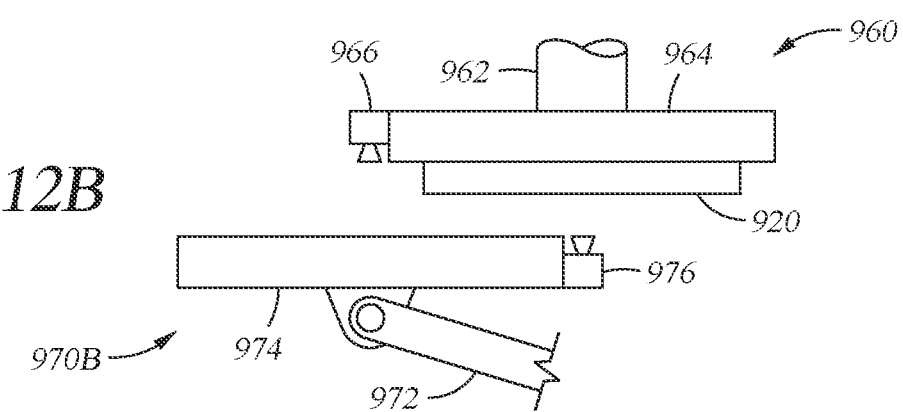
Figure 12C:
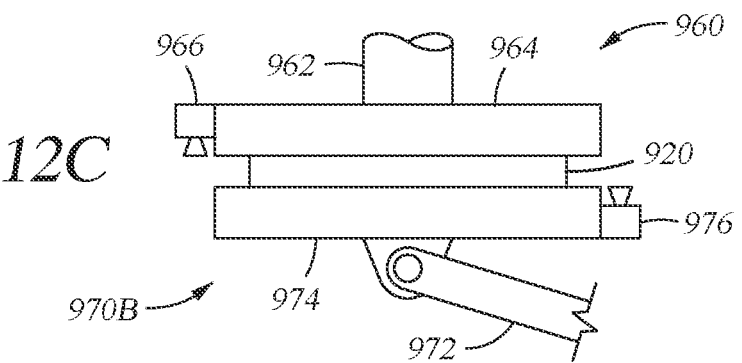

FIGS. 12A-12G schematically illustrate an exemplary operational sequence of the robot 960 and the auxiliary robot 970. FIG. 12A shows the head 964 of the robot 960 being attached to the item 920. In some embodiments, the sensor 966 may be used to determine the position, orientation, and/or extent of the item 920 on the work surface 910 before the head 964 is attached to the item 920. FIG. 12B shows the robot 960 carrying the item 920 to the auxiliary robot 970. In the depicted embodiment, the auxiliary robot 970 is represented by auxiliary robot 970B. In this example, the auxiliary robot 970B is represented as including an articulated arm 972 attached to a head 974. In some embodiments, the head 974 is configured similarly to the head 964 of the robot 960. As illustrated, in some embodiments, the auxiliary robot 970B includes the second sensor 976, as described above. In an example, the second sensor 976 includes a camera. As shown in the Figure, in some embodiments, the second sensor 976 may be used to determine the position, orientation, and/or extent of the item 920 on the head 964 of the robot 960. Such information may be used to direct the head 964 of the robot 960 when the head 964 positions the item 920 onto the head 974 of the auxiliary robot 970B. FIG. 12C shows the head 964 of the robot 960 positioning the item 920 onto the head 974 of the auxiliary robot 970. Then the head 964 of the robot 960 disengages from the item 920.

Figure 12D:
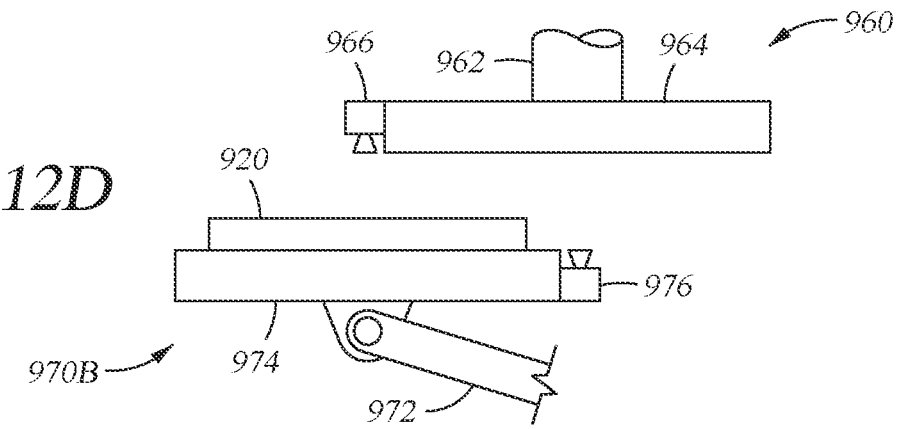
Figure 12E:
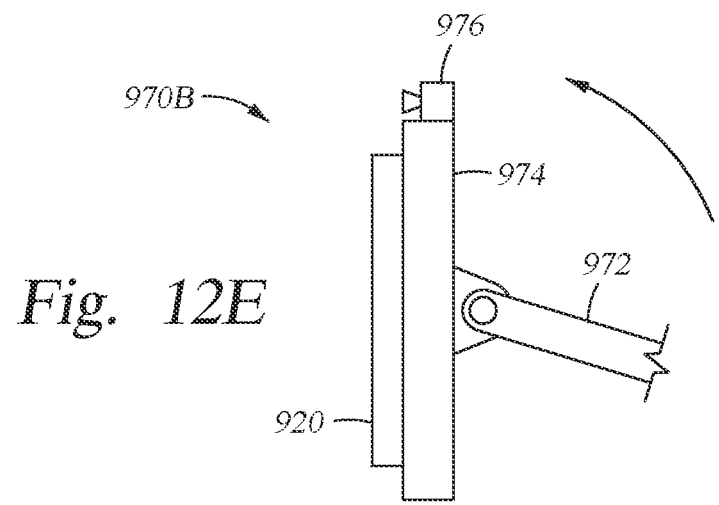
Figure 12F:
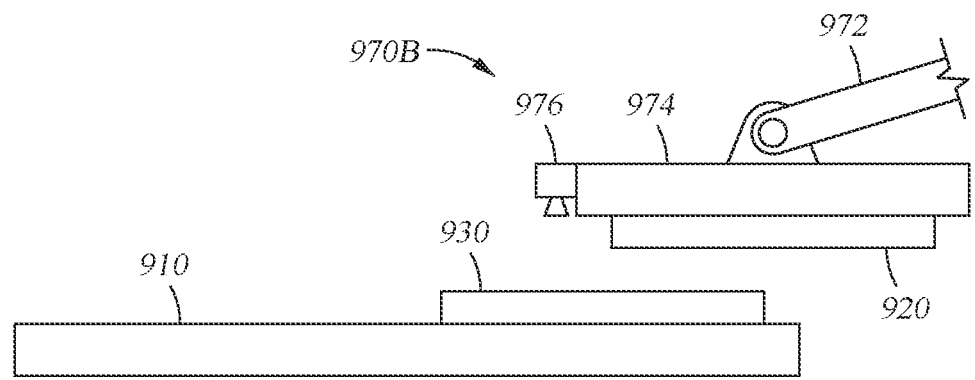

FIG. 12D shows the sensor 966 of the robot 960 being used to determine the position, orientation, and/or extent of the item 920 on the head 974 of the auxiliary robot 970B. Such information may be used to direct the head 974 of the auxiliary robot 970B when the head 974 positions the item 920 onto the item 930 on the work surface 910. FIG. 12E shows the head 974 of the auxiliary robot 970B swiveling to orient the item 920 for placement onto the item 930 on the work surface 910. FIG. 12F shows the second sensor 976 of the auxiliary robot 970B being used to determine the position, orientation, and/or extent of the item 930 on the work surface 910 before the auxiliary robot 970B positions the item 920 onto the item 930. In embodiments in which item 930 is mounted to a frame, the sensor 976 may be used to determine the position, orientation, and/or extent of the frame. Additionally, or alternatively, the sensor 976 may be used to identify a fiducial on the frame, such as fiducial 946, described above.

Figure 12G:
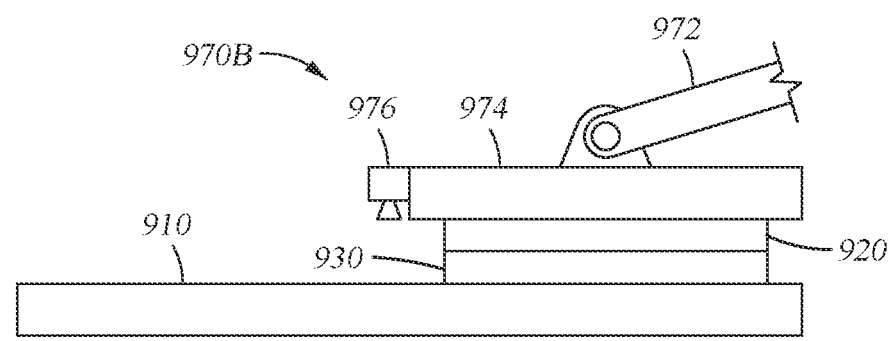

FIG. 12G shows the auxiliary robot 970B positioning the item 920 onto the item 930 on the work surface 910. In some embodiments, the auxiliary robot 970B may be operated such that the head 974 imparts a load onto the item 920 in order to press the item 920 against the item 930, and promote distribution of the adhesive 154 between and/or within the item 920 and the item 930. In some embodiments, the head 974 of the auxiliary robot 970B includes a heater. In such embodiments, the heater may be actuated while the head 974 presses the item 920 against the item 930 in order to cure the adhesive 154, and bond the item 920 to the item 930. In some embodiments, the heater may be omitted or present but unused. Upon completion of the positioning and any curing operation by the auxiliary robot 970B, the head 974 of the auxiliary robot 970B disengages from the item 920.

The systems and methods of the present disclosure facilitate automation of fabric article manufacture. Such automation benefits manufacturing plant throughput and consistent quality control of finished products.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

It is contemplated that elements and features of any one disclosed embodiment may be beneficially incorporated in one or more other embodiments. While the foregoing is directed to embodiments of the present disclosure, other and further embodiments of the disclosure may be devised without departing from the basic scope thereof, and the scope thereof is determined by the claims that follow.

What is claimed is:

1. A method of manufacturing a fabric article, comprising:
   unwinding a web of fabric, thereby creating an unwound fabric;
   mounting a portion of the unwound fabric in a first frame, wherein the first frame is larger than the fabric article being manufactured, wherein the first frame includes one or more reference points indicative of one or more manufacturing operations for manufacturing the fabric article;
   determining, based on the one or more reference points, one or more adhesive deposition locations on the unwound fabric;
   applying, based on the one or more adhesive deposition locations, adhesive to the portion of the unwound fabric using an adhesive applicator;
   mounting a fabric item in a second frame, wherein the second frame is larger than the fabric item;
   determining, based on the one or more reference points, one or more locations to position the fabric item onto the portion of the unwound fabric;
   positioning the second frame in reference to the first frame such that the fabric item is positioned onto the portion of the unwound fabric at the one or more locations, thereby adhering the fabric item to the portion of the unwound fabric,
   determining, based on the one or more reference points, one or more cutting locations for cutting the portion of the unwound fabric; and
   cutting, based on the one or more cutting locations, through the portion of the unwound fabric, thereby creating combined first and second components of the fabric article adhered.

2. The method of claim 1, further comprising releasing at least the portion of the unwound fabric from the first frame after the cutting through the portion of the unwound fabric, wherein the cutting through the portion of the unwound fabric results in one or more cuts being intermediate cuts that do not completely disengage the unwound fabric from the first frame.

3. The method of claim 1, wherein the portion of the unwound fabric remains integral with the web of fabric until the cutting through the portion of the unwound fabric.

4. The method of claim 1, further comprising updating a database, based on detection of the one or more reference points, to indicate at least one of the one or more manufacturing operations is complete.

5. The method of claim 1, further comprising releasing, before the cutting through the portion of the unwound fabric, the portion of the unwound fabric from the first frame.

6. The method of claim 1, further comprising releasing, before the cutting through the portion of the unwound fabric, the fabric item from the second frame.

7. The method of claim 1, wherein the one or more reference points includes:
- a symbol printed on, embossed in, or formed on a surface of the first frame,
- a barcode,
- a quick response (QR) code, or
- a radio frequency identification (RFID) tag.

8. The method of claim 1, further comprising releasing the fabric item from the second frame after the cutting through the portion of the unwound fabric, wherein the cutting through the portion of the unwound fabric results in one or more cuts being intermediate cuts that do not completely disengage the unwound fabric from the first frame.

9. The method of claim 1, further comprising:
- detecting, using a sensor coupled to a controller, the one or more reference points;
- accessing, in response to the detecting, a database preloaded with the one or more manufacturing operations; and
- performing at least one of the one or more manufacturing operations from the database corresponding to the one or more reference points detected.

10. The method of claim 9, wherein the sensor includes one or more of:
- a camera,
- a barcode reader,
- a quick response (QR) code reader,
- a radio frequency identification (RFID) tag reader, or
- a proximity sensor.

* * * * *